Nov. 15, 1960 C. T. LOSHING ET AL 2,960,266

DATA PROCESSING SYSTEM

Filed Aug. 4, 1958 10 Sheets-Sheet 1

INVENTORS
CLEMENT T. LOSHING, &
RALPH J. THOMPSON
BY
Williams & Tilberry
ATTORNEYS INVENTORS
CLEMENT T. LOSHING &
RALPH J. THOMPSON
BY
Williams, Tilberry + Golrick
ATTORNEYS INVENTORS
CLEMENT T. LOSHING, &
RALPH J. THOMPSON
BY
Williams & Tilberry
ATTORNEYS Nov. 15, 1960 C. T. LOSHING ET AL 2,960,266

DATA PROCESSING SYSTEM

Filed Aug. 4, 1958 10 Sheets-Sheet 4

INVENTORS
CLEMENT T. LOSHING, &
RALPH J. THOMPSON
BY
Williams & Tilberry
ATTORNEYS

| DEC. DIGIT DISPLAYED \ COUNTER OUTPUT POSTS | 13 | 14 | 15 | 16 (HUNDREDS) |
|---|---|---|---|---|
| | 17 | 18 | 19 | 20 (TENS) |
| | 21 | 22 | 23 | 24 (UNITS) |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 1 | 0 |
| 5 | 0 | 1 | 1 | 1 |
| 6 | 1 | 1 | 0 | 0 |
| 7 | 1 | 1 | 0 | 1 |
| 8 | 1 | 1 | 1 | 0 |
| 9 | 1 | 1 | 1 | 1 |

INVENTORS
CLEMENT T. LOSHING, &
RALPH J. THOMPSON
BY
Williams & Tilberry
ATTORNEYS INVENTORS
CLEMENT T. LOSHING &
RALPH J. THOMPSON
BY
Williams & Tilberry
ATTORNEYS INVENTORS
CLEMENT T. LOSHING, &
RALPH J. THOMPSON
BY William E. Tilbury
ATTORNEYS

CONNECTIONS FOR 60 MINUTE DEMAND

CONNECTIONS FOR 30 MINUTE DEMAND

CONNECTIONS FOR 15 MINUTE DEMAND

CONNECTIONS FOR 5 MINUTE DEMAND

INVENTORS
CLEMENT T. LOSHING, &
RALPH J. THOMPSON
BY
Williams & Hilbury
ATTORNEYS

DATA PROCESSING SYSTEM

Filed Aug. 4, 1958

INVENTORS
CLEMENT T. LOSHING, &
RALPH J. THOMPSON
BY
Williams & Tilberry
ATTORNEYS Nov. 15, 1960 C. T. LOSHING ET AL 2,960,266

DATA PROCESSING SYSTEM

Filed Aug. 4, 1958 10 Sheets-Sheet 10

INVENTORS
CLEMENT T. LOSHING, &
RALPH J. THOMPSON
BY
Williams & Tilbury
ATTORNEYS United States Patent Office 2,960,266

Patented Nov. 15, 1960

2,960,266

DATA PROCESSING SYSTEM

Clement T. Loshing and Ralph J. Thompson, both of 55 Public Square, Cleveland 13, Ohio Filed Aug. 4, 1958, Ser. No. 752,869

33 Claims. (Cl. 235—61.1)

The present invention relates broadly to a method and apparatus whereby information may be gathered with respect to one or more variables, each dependent relative to a selected independent variable, in a form convenient for initial recording, and then translated into another form more adapted to human perception and understanding, or more susceptible to further consideration by mechanical or electromechanical devices. More particularly is this invention concerned with the recording of one or more variables dependent on a preselected independent variable in a tape form, and translation of the tape recorded data into a desired digit output either fed to a card punch machine converting the output data to punched card form suitable for ultimate use in a computer, or fed directly to a computer.

Specifically this invention is concerned with the recording of data in tape form, by countable impressions in one tape channel which can be considered as set off into groups by respectively successive identifying and countable impressions present in another channel of the tape; and the rapid translation of the data into a decimal digit type output as well as identification data output suitable for application directly to a computer or for application to a card punching machine producing punched and printed cards which may be used to provide an input to a computer.

Since any function that can be converted to a series of pulses by means of a suitable transducer may be handled by a system within the scope of this invention, the fields of utility of the invention are both broad and diverse, and detailed exemplification of its applications must be here limited to a few examples.

First there may be considered the case where a record is desired of a process variable or variables over a period of time, such as pressure, temperature, a flow rate. By a suitable sensing device or transducer and appropriate electronic means, such a variable or variables can be converted into a signal of variable frequency, the frequency at any given instant being a measure of the observed variable. By applying the signal through a magnetic recording head to a moving magnetic tape as one channel of information, and in another channel applying time pulses each with a predetermined spatial relation to the frequency record for the same time instant, a tape record results of the value of the variable with respect to time. By this invention, the information respecting the variable observed may be translated from a continuously running tape by counting the cycles represented in the frequency signal channel for successive intervals of time, by use of the associated time interval pulses to select and identify correlated portions of the frequency signal channel. Obviously data on a plurality of variables may be recorded by frequency or other signals in respective parallel tape channels, with time interval pulses again set forth in a time signal channel, and the data from each variable may be translated in like fashion. Further, the sensing elements or transducers may be scanned in a predetermined sequence, and the respective signals thereof applied to one channel in the tape, the time signals in another channel then serving to identify the information on the variables, so that the translated information may be accepted in proper order by the device utilizing the translated information and programmed in definite relation to the original scanning.

Another type of application involves the recording of at least one dependent variable quantity in tape form by a countable series or channel of tape impressions, the value of such dependent variable being represented by the total of impressions in the series up to a point under consideration; and the independent variable being represented in like manner in a second correlated channel by a series of impressions, the spacing between adjacent impressions throughout this second channel representing equal increments in the independent variable. The count or increment of the dependent variable on the tape then is readily available for consideration in terms of an increment ratio, as $\Delta Y/\Delta X$, where the dependent variable count for a preselected increment of the independent variable, established by use of independent variable impressions, is translated as a single output item.

For a quite specific example of a prior practice superseded by the present invention, consider a public utility, such as an electric company, which for one reason or another is concerned with a statistical study to determine the load imposed upon its facilities by one or more classes of its consumers, or by a particular type of electrical device used by the consumers, at different times throughout the day over some extended time. In such case, service demand recording devices are set up for each of a number of typical consumers, the several records of which would have to be considered simultaneously, period-by-period, to derive final desired information on, for example, the maximum demand of the class upon the utility facilities, or the demand to be expected at certain times.

In the past circular chart recording kw.-hr. meters have been used, and the record on each had to be read visually at each desired interval (often a meter scale constant being applied to the reading), and then tabulated for further use, a slow and laborious process greatly subject to error, and often involving months of work to process data for a single study. Some improvement has been attained by a mechanical translating device still requiring manual setting of the device and chart manipulation by an operator at each desired interval on the chart to produce a punched card suitable for consideration by modern business machines. Although such improvement about halved the time required for data processing, and decreased opportunity for error, it left much to be desired in speed and accuracy.

By the present method and apparatus, it is now possible to use a tape recording meter placing on a suitable tape in one "channel" an impression for each set amount of energy (selected as a unit for a particular measurement) and in a second "channel" impressions indicating equal time intervals throughout the measurement; and then to translate the tape information into an output form suitable as the direct input of a computer machine, or as the input to a card punch machine which puts the original data directly into printed and punched card form for subsequent use in modern business and accounting machines. In either case the data processing for a given study proceeds automatically and with a minimum opportunity for error, in a matter of a day or two, or even hours, in comparison with the months often previously required.

The general object of the present invention is then to provide apparatus and method whereby observations of one or more dependent variables may be recorded in tape form, and then translated rapidly and automatically into an output form suitable for application as the direct input to a compute machine; or as the direct input to a card punching and printing machine producing cards bearing the observed information, which may subsequently be used as the information input to a computer.

Another object is the provision of means for translating data from a continually running tape into an output form which may be applied to a card punch or directly to a computer.

Another object is the provision of tape data translating apparatus of the character described having great flexibilty of application.

A still further object is the provision of tape data translating apparatus of the character described adapted to automatic operation with a minimum of operator attention and including means to sense malfunctioning and stop the operation.

Another object is to provide apparatus and method whereby measurements of a dependent variable may be put into an output form, adequately representing the dependent and independent variable for purposes of studies involving the variation in the increment ratio of the variables.

A still further object is the provision of apparatus for translating, into punched card form, tape recorded data involving correlated series of tape impressions, a series for at least one dependent variable and another series for an independent variable. Other more specific objects and advantages will appear from the following description and the drawings.

Figure 1:
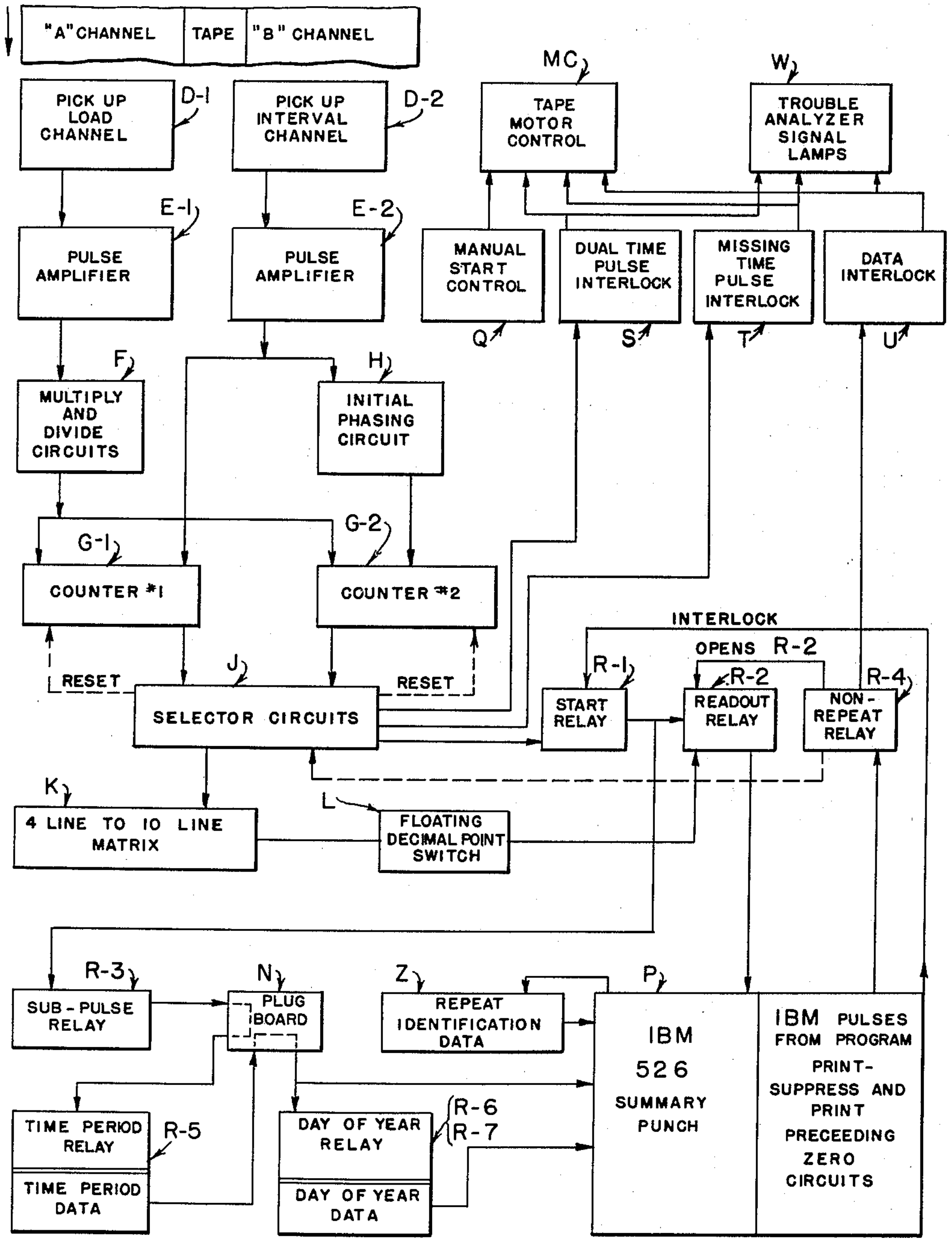
Fig. 1 is a block diagram or functional outline of a data translating system embodying one form of the present invention, whereby power load data recorded in tape form is converted automatically into punched card form.
Figures 4, 7:
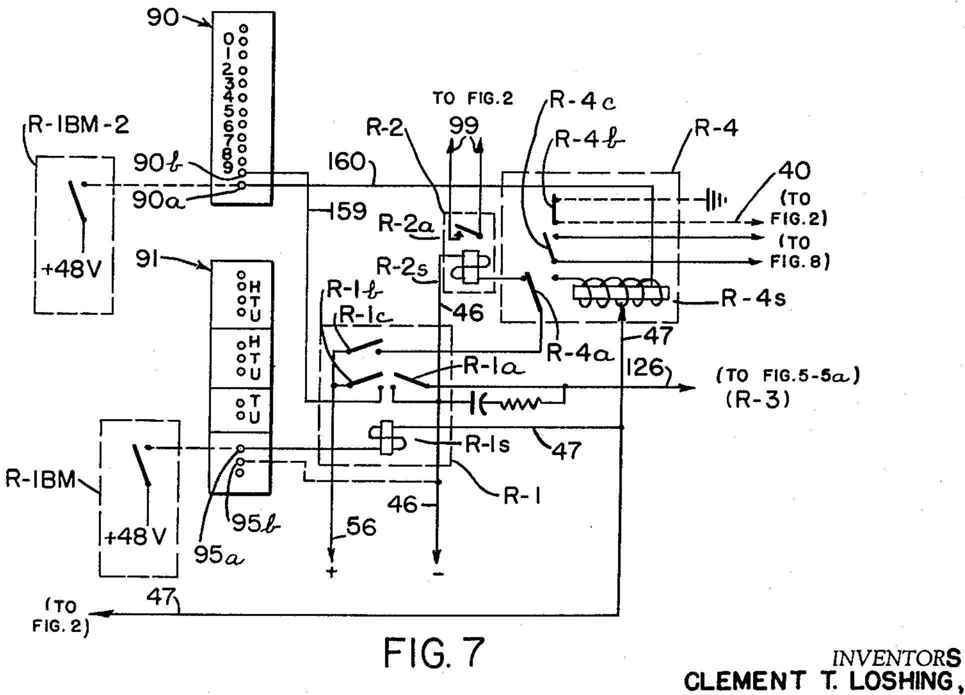
Fig. 4 is a tabular diagram of the four-line coded output whereby decimal digits are represented at the output terminal blocks of the counters.
Figure 5:
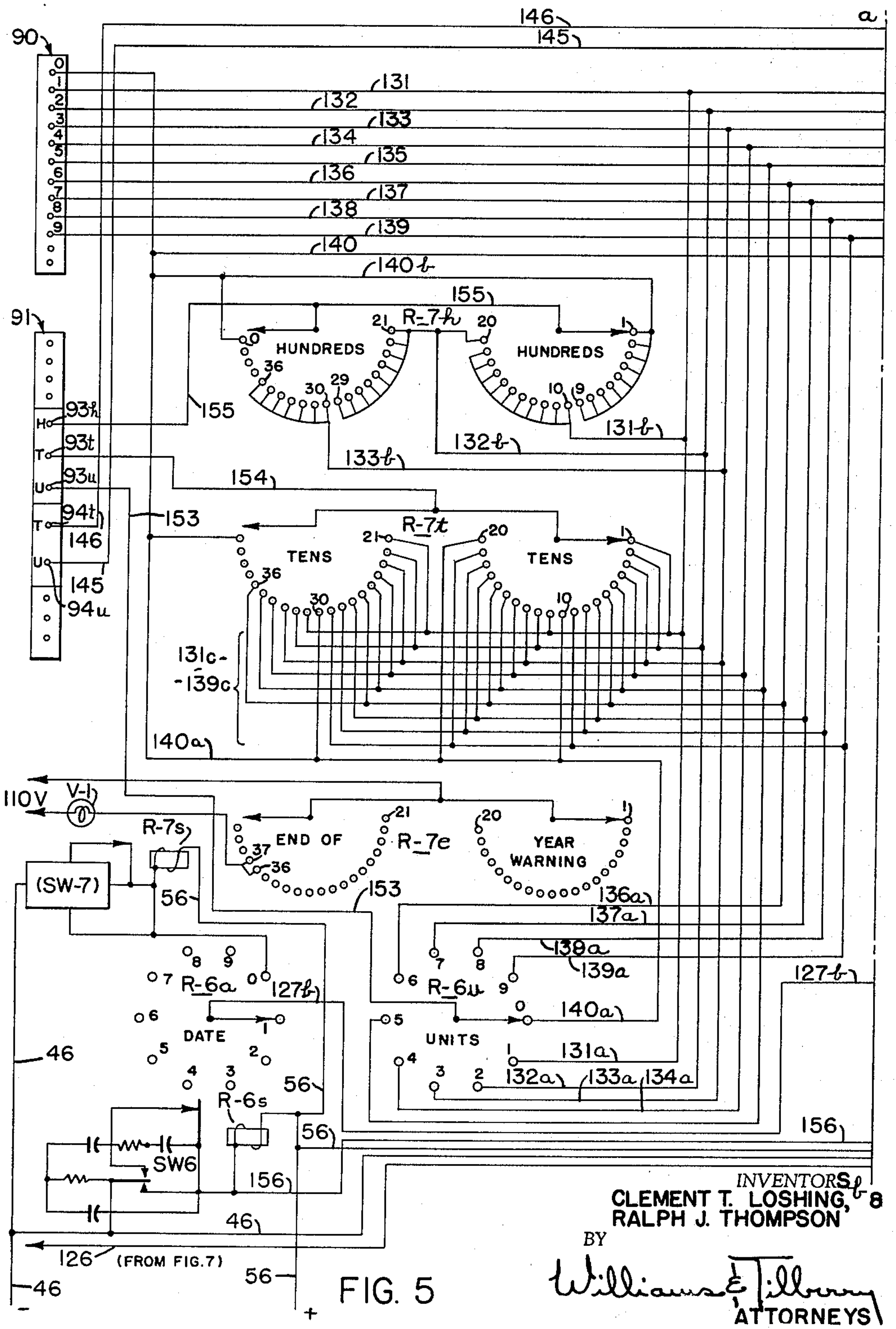
Figures 5A, 5B:
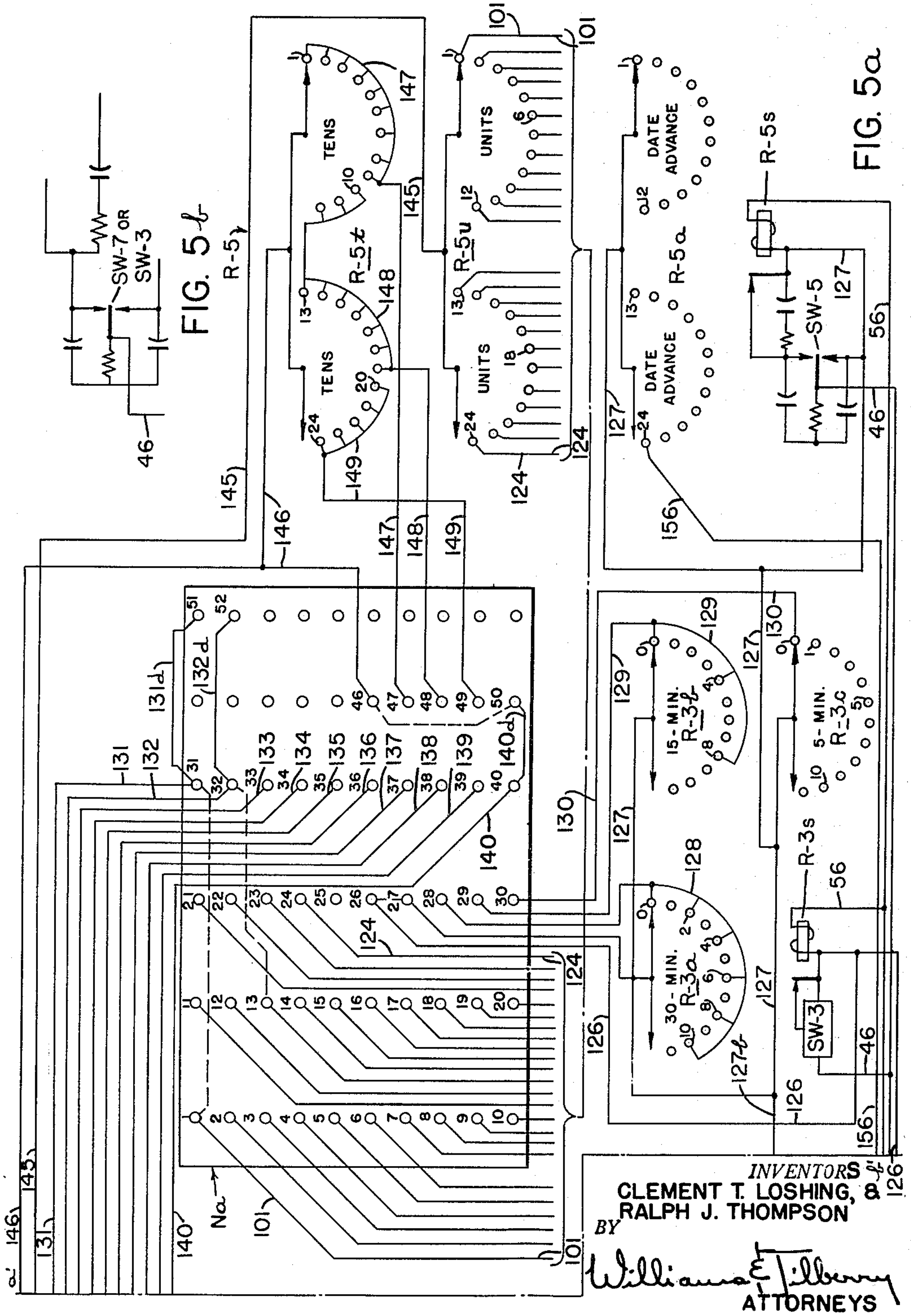
Figure 8:
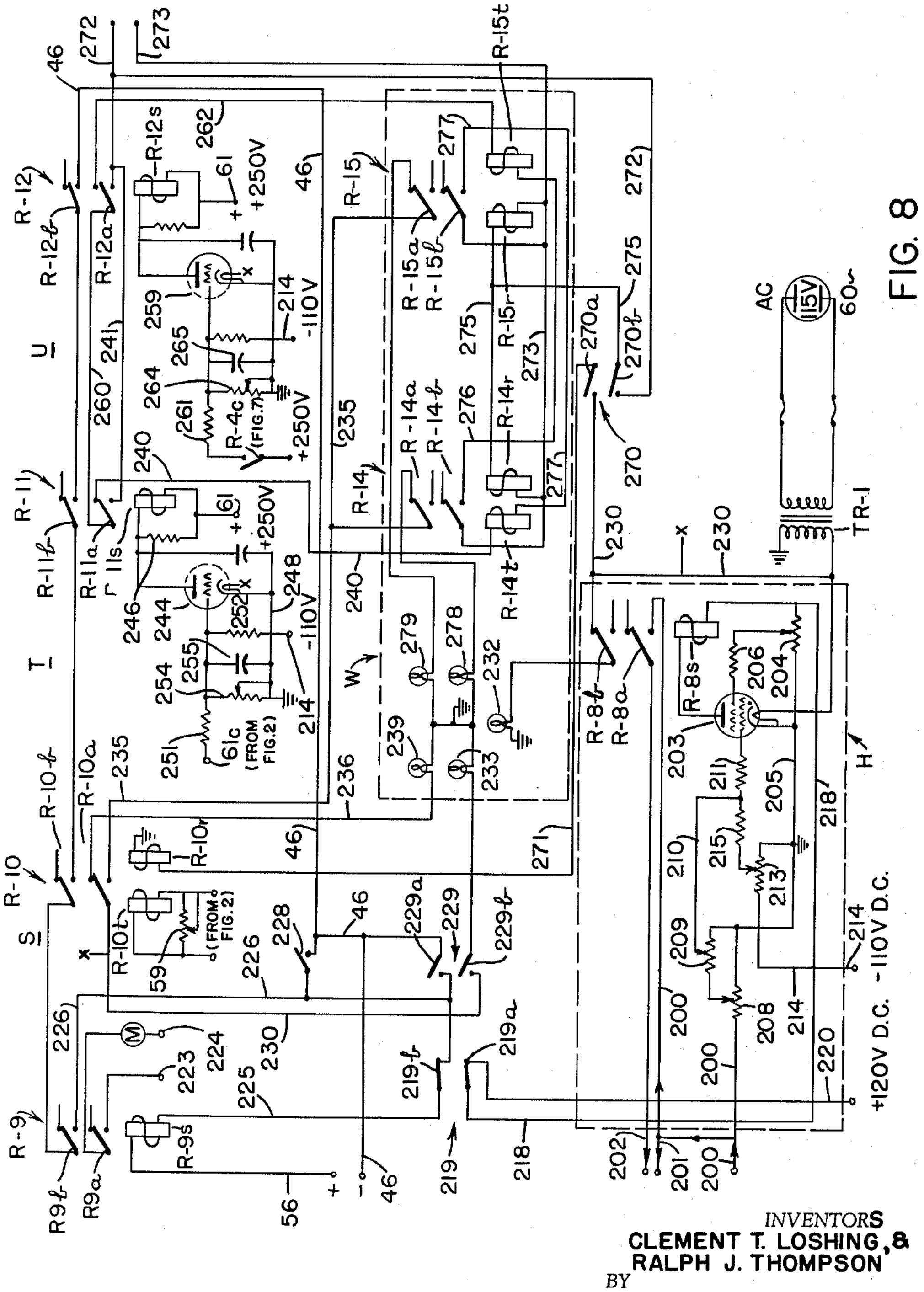
Figure 9:
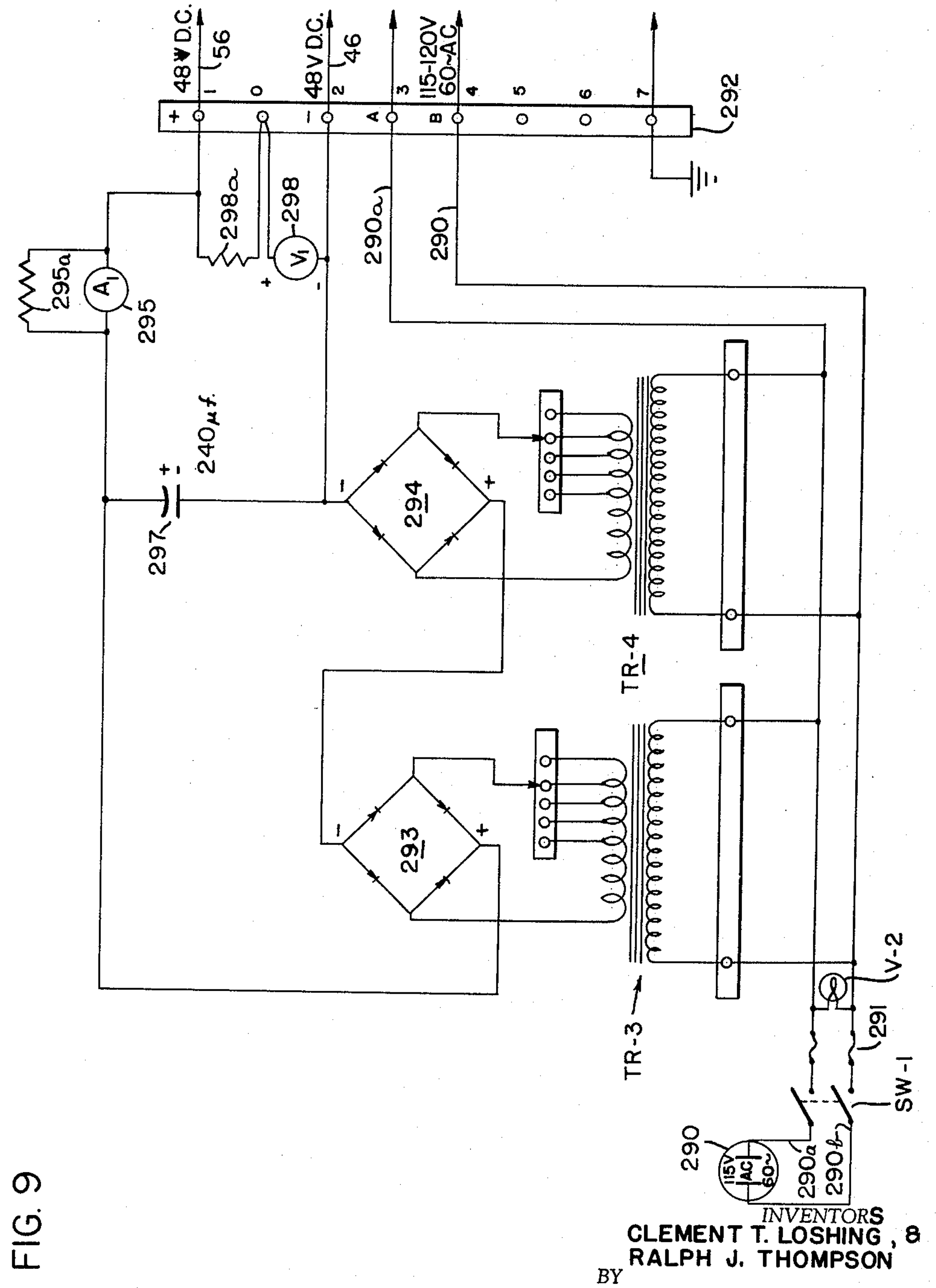

Figs. 5, 5*a* and 5*b* together present a schematic wiring diagram of circuitry for production of date and period identifying input to an IBM summary punch;

Figs. 6, 6*a*, 6*b* and 6*c* are plugboards wired for use in the plugboard receptacle appearing in Fig. 5*a* respectively where 60-minute, 30-minute, 15-minute and 5-minute time intervals of data appear on the tape;

Fig. 7 is a schematic wiring diagram showing certain relays involved in the system, principally the starting relay, the read-out relay and the nonrepeat relay;

Fig. 8 is a schematic diagram for certain system controls, namely the motor control, start-up control, trouble analyzer signal lamps, sensing circuits for certain malfunctions, and also an initial phasing circuit for the electronic counters appearing in Fig. 1; and Fig. 9 is a schematic diagram of a power supply for certain portions of the system.

In the drawings the block diagram of Fig. 1 indicates the functional relationship of circuits, and other system components for one embodiment of the invention, whereby data represented in a plurality of channels or distinct longitudinal strips of information on a tape element is translated into an output form which may be fed as the input of a card punch and printing machine P, such as an IBM 526 summary punch modified slightly for this system, to produce a series of punched cards bearing the tape information. Although the tape could conceivably be a punched paper tape, embossed paper tape or conductively printed tape, or a photo film strip with information represented by discrete light and dark areas with, of course, corresponding electromechanical or photo cell type sensing pickups or transducers, because of its particular practical advantages, availabilty and present wide use, the tape is preferably a magnetic tape with information magnetically impressed thereon in two longitudinal series or channels, the data in each channel being represented by a pattern of magnetization which, through suitable transducers and circuitry, will produce a corresponding series of distinct pulses suitable to counting.

For convenience of discussion, the invention is hereinafter considered in terms of electrical energy demand measurements recorded on magnetic tape, although susceptible of broader applications as already noted.

Figure 1A:
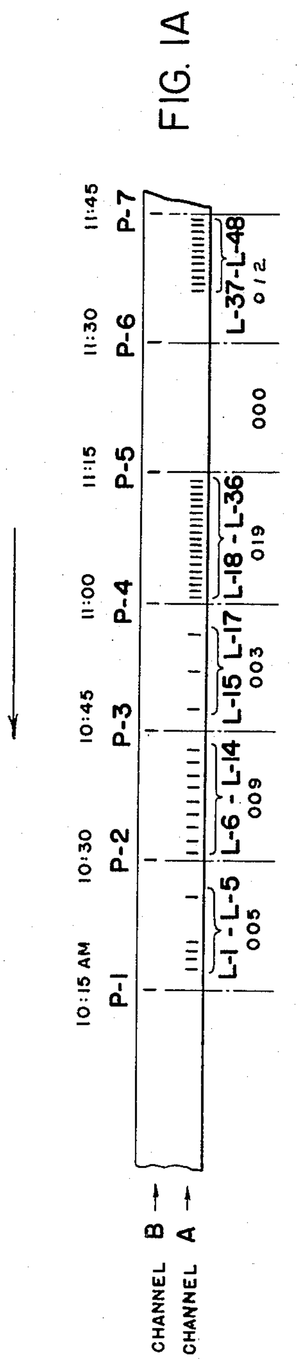
Figs. 1A–1B represent sample lengths of a two channel magnetic tape with recordings thereon of load data magnetically impressed lengthwise thereon to constitute one longitudinal channel, and of time interval marking magnetic impressions in a second channel.
Figure 1B:
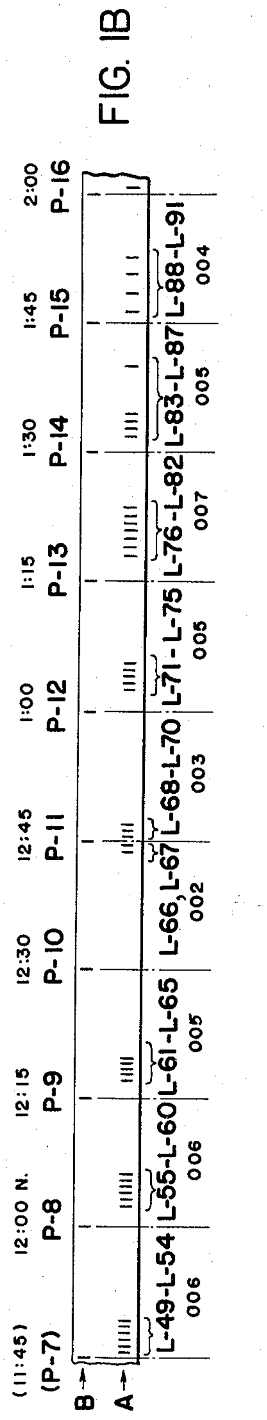

The tape (of which only a small transverse section is schematically represented in Fig. 1 with sample lengths thereof represented in Figs. 1A–1B), is considered to have two channels of information, such as is produced by an available standard recording kilowatthour meter recording (lengthwise along one half of the tape width) load or energy demand information and along the other half time signals. The one side of the tape (hereinafter called the A, load, or demand channel of the tape) has distinct magnetic impressions, each applied by a magnetizing head, an electromagnetic device which in one standard and well known type of meter is pulsed upon closure of contacts driven by the meter, for each unit of some selected amount of energy measured. The other side of the tape (hereinafter termed the tape B or time interval channel) has time impressions applied by a similar device at fixed time intervals throughout the operation of the meter, for example every five minutes, through closure of switch contacts by a synchronous electric clock motor, which may also be the recorder tape transport motor.

In Fig. 1A, for example, discrete magnetized areas, resulting in channel A along the lower half of the tape by successive pulses of the magnetizing head recording load data, are represented by the short vertical marks identified by the respectively adjacent legends L–1 to L–48. Likewise discrete magnetized areas, resulting in channel B along the upper half of the tape in consequence of pulsing of the magnetizing head recording time, are represented by the marks respectively identified by legends P–1 to P–7. Other legends adjacent the tape in Fig. 1A will be later explained.

With a pulsing of the B channel time interval recording head on the quarter-hours, each successive pair of marks P sets off a length of the tape corresponding to 15 minutes, and thereby identify the set of L marks, if any, which were applied by the load data recording head, during the particular 15 minute period in question. Thus in the first 15 minute interval designated by P–1 and P–2 in the B channel, five units of energy were used, since the five marks L–1 to L–5 inclusive occur in the corresponding length of the A channel; in the later interval P–4 to P–5, with marks L–18 to L–36 in the corresponding length of the A channel, 19 units; but in the interval P–5 to P–6, where the associated A channel length has not any marks, no energy was used, or at least was used at a rate markedly less than one unit per 15 minutes.

The above-described tape representation assumes that the two magnetizing heads in the recorder were centered on a transverse line, a line perpendicular to the tape length, resulting in a side-by-side correspondence of linear portions of the two channels. A spacing or off-set of the heads along the line of tape travel would likewise result in a linear correspondence of portions of the two channels, but with the corresponding lengths translated longitudinally by a distance equal to the off-set of the recording heads. Similar considerations of correspondence prevail where more than two channels come into use.

Suitable motor driven tape transport means, preferably reversible, carry the tape under like pickup heads D–1, D–2, here magnetic transducers, for the A and B channels respectively, the output of each being applied to respective amplifiers E–1, E–2, here called pulse amplifiers since used to amplify the respective transducer output pulses to a usable level. At each magnetic "mark" on the tape the amplifier E–1 or E–2 for the corresponding channel produces then an amplified output pulse, which in discussion hereinafter will be designated by the same legend as the tape impression originating the same.

The output signals or pulses from the load pulse amplifier E–1 are fed, preferably through an electronic multiplier and/or divider circuit E, to the load pulse counting channels of electronic counters G–1, G–2. The time interval pulses derived from the tape B channel are applied directly from amplifier E–2 to the time interval pulse counting channel of the counter G–1; and, through an "initial phasing" circuit H to the time interval pulse counting channel of the counter G–2. The circuit H withholds only the first time interval pulse P–1 from counter G–2, and thereafter all succeeding time interval pulses are applied to both counters. Successive time interval or B channel pulses serve alternately to start and stop a given counter, with the counters alternating in counting the load channel pulses for successive intervals.

The electronic counters G–1 and G–2 each provide a four-line coded output for each of as many decimal digits as may be desired, for present purposes the hundreds, tens and units. The four-line coded count outputs of the counters are applied through the selector circuitry J alternately to a matrix K converting the same to a ten-line 0–9 "output" for each digit. The resetting of each counter may be effected by a resetting condition established by a resetting signal fed back from the nonrepeat relay R–4 through the selector circuit to the corresponding counter as indicated by the dash reset lines, or each counter may be internally reset automatically after a selected display time period adjusted to the over-all operating conditions of the system.

A pulse or signal from the selector circuit arising at the time a given counter applies its load count output through the selector circuit to the matrix, subject to a special interlock control provided by an IBM summary punch modification utilizing the "zero print" circuit from the punch program, causes operation of a start relay R–1. This in turn operates the read-out relay R–2 permitting the matrix ten-line coded output, preferably coming through a floating decimal point switch L, to be read out by or applied to the IBM summary punch and punched into a card under otherwise appropriate conditions.

The information of the matrix output having been punched into a card, a condition is presented by a modification of the punch "print suppress" circuit from the punch program, which provides a signal sent from the punch to the nonrepeat relay R–4 causing the nonrepeat relay to open and hold the read-out relay open and thereby prevent a repunching of the matrix output information; and also causing the relay R–4 to send a signal to the data interlock circuitry U as hereinafter explained.

Since an eighty column card, preferably having data identification punched therein and using say three columns for punching each interval's load data, would contain but relatively few intervals of data thereon, for example twenty-four intervals, whereas the tape would usually contain a vast amount of information requiring many cards, as a practical matter each card must contain data identifying the date and time period embraced thereby. Accordingly, a signal or pulse derived from the operation of the start relay R–1 for each interval of load information counted from the tape A channel also serves to provide date and time period information to be card punched. This is done by a time period stepping relay R–5 which in conjunction with a plugboard N provides an output periodically, at least once for each card, and also by day-of-year stepping relays R–6, R–7, providing day-of-year date output for each card, the date advancing automatically, and the period also, in consequence of the pulses from the start relay.

Since it is preferable that the apparatus be adaptable to handle tapes with different time intervals, the pulses from R–1 are fed to a sub-pulse relay R–3 which, by plugboard connections, selected according to the time interval corresponding to successive tape B channel pulses (the interval being fixed for a given tape), passes to R–5 only such pulses as correspond to say one hour of data for pulsing or advancing R–5. The relay R–5 in conjunction with other plugboard connections at N, then has available at selected periods, determined by the plugboard connections, period output information. This period information, when accepted by the punch program, is punched in numerical form, indicating to which part of the day punch-dated on the card the card load data pertains; in other words the serial order of the card.

Pulses from R–1 are also passed by R–5, with its operation determined as above stated, by R–3 and the connections at plugboard N to advance the day-of-year relays R–6 and R–7 which again provide to the IBM punch day-of-year information to be punched in usual numerical form on each card.

Since the operation of apparatus of this character is intended to be automatic, proceeding at high speed with a minimum of operator attention, any malfunction could continue through a great number of cards. Hence the tape motor control circuitry MC is subject not only to manual operational control means Q, but also to the circuitry of the dual time pulse interlock S, missing time pulse interlock T, and data interlock U. These interlocks not only stop the tape transport motor, and hence operation of the entire apparatus, but also operate trouble analyzer circuitry W which gives a visual panel signal indicating the particular malfunction which initiated the stoppage.

A double time pulse, which would apply the output of both counters to the matrix and hence to the punch, provides in effect a signal originating at the selector circuit to the dual pulse sensing circuitry S. A missing time pulse malfunction, that is, lack of a pulse derived from the tape B channel and applied to the counters, would cause the count of two successive intervals of data to be included as in a single count, and all successive periods to be punched and represented falsely as to time by a displacement of one interval. The selector circuitry therefore is arranged to provide regular pulses to the missing time pulse interlock circuit T corresponding to applied tape B channel pulses, so that a missed pulse may be sensed at T.

Improper synchronization of the operation of data presentation to the punch, with respect to the punching operation or programming would result in inaccurate translation to the cards. For example if time interval data should for any reason not be available when the punch is programmed therefor, the punch would wait until such data would be available and load data would be missed by the punch. This could be caused by improper starting synchronization, mechanical or electrical failure of relays or other components, or other causes. Therefore the relay R–4 is used to provide regular signals or pulses to the data interlock circuit U, under the control of pulses from the IBM punch, so that when the nonrepeat relay pulse to circuit U is unduly late or omitted because of a lagging punch, the circuit U sensing the pulse irregularity then stops the tape. Also where the data of a particular tape runs over the end of a year, the relay R–7 is arranged so that no data is presented to the punch, which then stops, bringing into operation this data interlock operation to stop the tape transport.

The punch is also programmed as indicated at Z to repeat tape, consumer or other constant data identification on each card resulting from a given tape, after such data is manually punched by means of the IBM keyboard into the first card. Likewise initial day-of-the-year or period data may be punched into the first card, though changed and supplied automatically in subsequent cards. The punch is, of course, programmed to read-out from the system the other constant data, load data, time period data and day-of-year for the column pattern established for the cards.

It may be here noted that the term "pulse" or "signal" as herein used may mean either a potential, current, or established electrical characteristic or circuit configuration affecting the operation of some functional component. Specifically with respect to the terms "input" or "output" as applied to a form in which information is fed to the summary punch, there is intended a configuration of circuit paths provided from the digit terminals of the digit input terminal strip to the terminals of the column input terminal strip of the IBM punch.

Considering now the functional units and their operation, above discussed in a general manner relative to Fig. 1, it is first noted that the pickup heads D–1 and D–2 and tape transport mechanism, the amplifiers E–1 and E–2, the electronic multiplying and/or dividing circuit F, may be conventional circuitry well known to the art and hence are not further described in functional or physical detail. Likewise the punch, an IBM Model 526 Summary Punch, and the counters G–1 and G–2, 1957 Model 7060 Electronic Counters capable of 1,000,000 counts per second (or even the slower Model 7050 capable of 100,000 counts per second), of the Berkeley Division of Beckman Instruments, Inc., are well known to the art, and are hereinafter described as to circuitry or function only insofar as required for an understanding of the rest of the system in which they are used.

Each counter is set for so-called "A/B operation," wherein one input trigger channel of the counter, here again called the A channel, serves to generate for each input signal pulse a pulse suitable for counting circuitry; while another input trigger channel, the B channel, similarly generating for each input pulse a pulse suitable for operation of control circuitry, opens and closes on successive B channel input signals a gate circuit applying the A channel pulses to the counting circuitry. By standard adjustment means provided in the counters, the slope sensitivities of the B channel circuits are set about 180° out of phase so that one counter will start on the positive slope of one pulse and stop on the negative slope of the next pulse, while the other counter stops on the positive slope of one pulse and starts on the negative slope of the next. Hence a given time interval pulse of the tape B channel will start one counter and stop the other as previously noted.

*Selector circuitry J (Fig. 2)*

Figure 2:
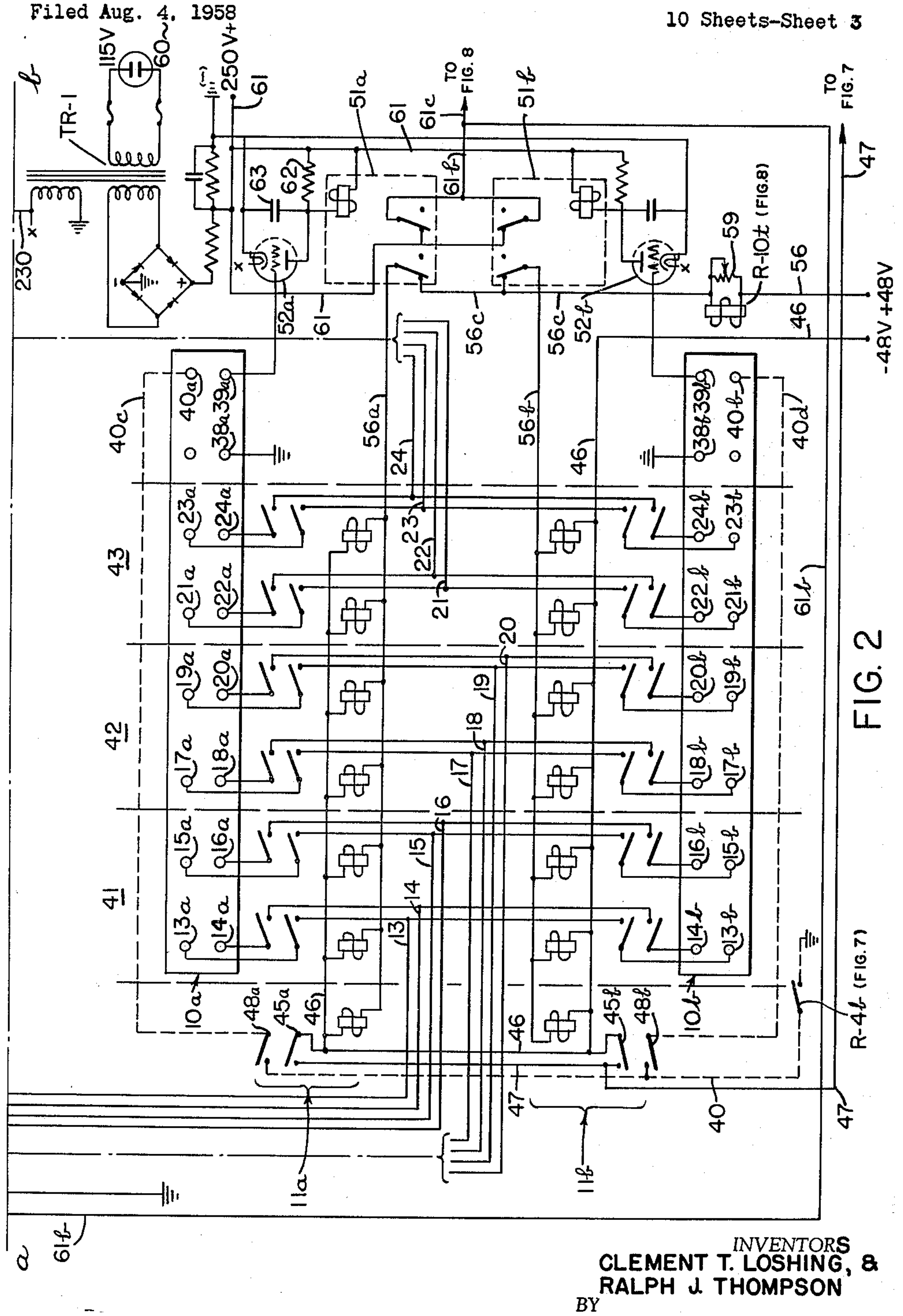
Fig. 2 is a schematic diagram for the selector circuits and certain other associated circuitry.
Figure 3:
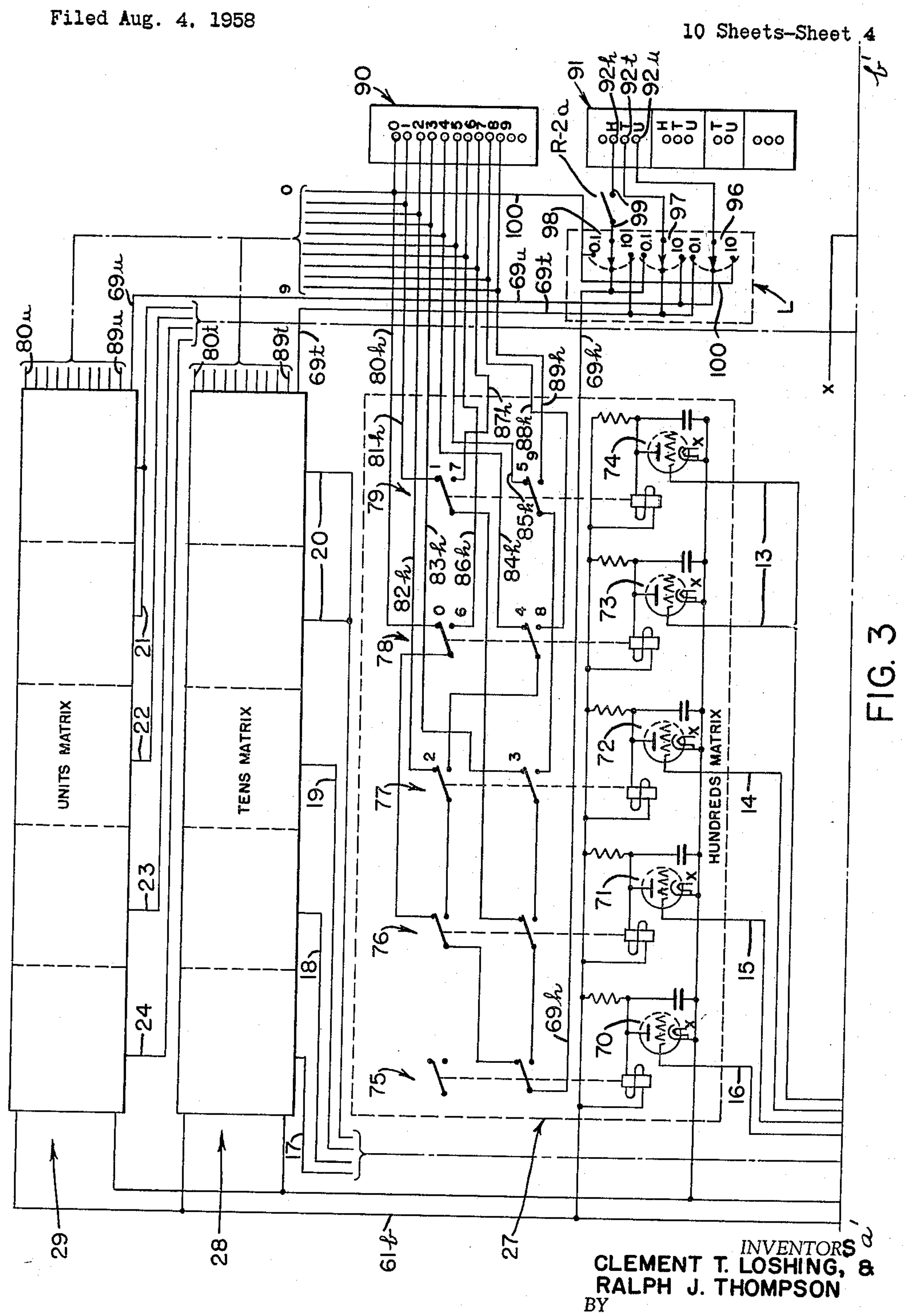
Fig. 3 is a schematic diagram of a matrix system for conversion of a four-line coded electronic counter output to a ten-line code output suitable for input to an IBM summary punch, and also of a floating decimal point switch.

In Fig. 2, which shows the counter selector or switching circuitry J whereby the four-line coded output of each counter is applied alternately, and when ready, to the matrix K represented in Fig. 3, the output terminal blocks of the respective counters are indicated by the general reference characters 10a and 10b. It will be noted that the terminals on each of these blocks are grouped in three main sets of four; for example on 10a, the set of 13a, 14a, 15a, 16a for the highest order digit of the digits here used—the hundreds digit; 17a, 18a 19a, 20a for the next, or tens digit; and 21a, 22a, 23a, 24a for the next, or unit digit, while at the right end there appears a group of three, a ground terminal 38a, commonly grounding the switching circuitry and counter G–1, and two additional terminals 39a and 40a. Similarly disposed in the block 10b are like numbered functionally identical terminals 14b to 24b and 38b, 39b and 40b.

These counters, of the character generally described relative to the functional block diagram, are binary type electronic counters which display a registered decimal count by various permutations, within each terminal set for a particular digit, of what might be termed off-on potentials of each of the terminals relative to the corresponding ground terminal of the counter. These permutations are set forth in tabular form in Fig. 4 wherein the symbol "0" represents a potential, for example, 15 volts or more negative to ground and the symbol "1" represents a voltage or potential either at ground or positive to ground.

In the counters of the described type, the terminal 39a (or 39b) provides a control signal potential from the counter, (here used to control selector circuitry in a manner to be described), being positive relative to ground from reset of the counter to the end of an ensuing counting period, and becoming negative at the end of a count period (when the "B" channel shuts off count) for duration of the count display period up to reset. The counters include automatic reset circuitry whereby the count is held for a display period selectable within the range of about 0.05 to 5 seconds, but the reset can be subject to a prohibitory control through terminal 40a (or 40b) which prevents reset as long as it is grounded.

Since a count output of three decimal digits is utilized, the matrix K includes (see Fig. 3) three identical sections, each for converting a corresponding four line coded decimal digit output of a counter into a ten line decimal code; namely, the hundreds matrix section 27, tens matrix section 28, and units matrix section 29, each having in addition to ground as an input line, the input lines 13—16, 17—20 and 21—24 respectively. Of these, because of circuitry identity, only the hundreds matrix section 27 is shown in detail in the drawings and hereinafter described.

Returning now to Fig. 2, for each counter terminal block there is a corresponding horizontal row of seven like relays, herein termed "phase relays," the rows being numbered with the general reference characters 11a and 11b respectively. Each of these relays has two sets of normally open contacts, and the solenoids of each row are here shown connected in parallel for simultaneously closing all the normally open contacts in such row.

In Fig. 2 it will be noted that corresponding sets of the 4-line coded output terminals and the relays associated with each set are set off as indicated by the dashed vertical lines in vertical groups, indicated by general reference numerals 41, 42, 43. Considering group 41, counter code terminals 13a and 13b are connected by corresponding normally open contacts of relay rows 11a and 11b to matrix input line 13; and similarly 14a and 14b to input line 14, 15a and 15b to input line 15, and 16a and 16b to line 16, by corresponding relay contacts. Similarly in the other groups, like-numbered terminals, contacts and input lines are functionally associated.

Accordingly as either the solenoids of relay row 11a or of 11b are energized, the hundreds 4-line coded output terminals, either 13a—16a of the counter G–1 or 13b—16b of G–2, are connected to the input of the "hundreds" matrix section 27. In like fashion by respective relay contacts the terminals 17a—20a or 17b—20b are connected to "tens" matrix section input line 17—20, and the terminals 21a—24a or 21b—24b to the input lines 21—24 of the "units" matrix section 29. Thus upon energization of the relays 11a or 11b all the 4-line coded output terminals 31a—24a of counter G–1, or 31b—24b of G–2, are connected to correspondingly numbered input lines of the matrix K.

Also the last relay (at the left) from row 11a and the last from 11b are grouped in a vertical pair providing corresponding contacts 45a, 45b connected in parallel between a negative 48 volt D.C. supply line 46 and a line 47 leading to the circuitry (see Fig. 7) of starting relay R–1 and non-repeat relay R–4; and also providing corresponding contacts 48a, 48b whereby reset inhibiting terminals 40a, 40b, as indicated by dashed lines 40, 40c, 40d may be grounded through normally closed contacts R4b in non-repeat relay R–4 where the internal automatic reset of the counters is not used.

For selective operation of the phase relay rows 11a and 11b, there also appears in Fig. 2 a pair of relays 51a, 51b—here termed matrix control relays—associated respectively with vacuum tube circuits including tubes 52a, 52b, (e.g., each are halves of 12AT7 tubes); and a "B" power supply therefor. A pair of normally closed contacts in relays 51a, 51b have each one side commonly connected by line 56c and current sensitive relay solenoid R10t to a positive 48 volt D.C. supply line 56, and each having its other side connected by a corresponding line 56a, 56b to solenoids of rows 11a, 11b respectively. Thus when the solenoid of 51a is deenergized and the contacts closed, the 48 volt D.C. source is applied by line 46 and 56, 56c, 56a to energize and close the relays of 11a; and with solenoid of 51b deenergized, to energize and close the relays of 11b. The function of the current sensitive tripping solenoid R10t shunted by an adjusting variable resistor 59, is detailed relative to the dual pulse sensing circuit of Fig. 8.

The conventional power supply appearing in Fig. 2 includes the transformer TR–1 supplied with 115–120 volt 60 cycle A.C.; a full wave dry rectifier unit with two diagonal corners across the high voltage secondary, and the other opposite corners connected respectively to ground and to one end of a voltage divider network; and a low voltage (6.3 v.) heater supply secondary with one end grounded and other end connected by a common line to the ungrounded cathode heater lead of all tubes if desired. The positive "B" supply line 61 from an intermediate point of the voltage divider provides a voltage of say of 250 volts positive relative to ground, serving here as the negative side of the plate or "B" supply.

Tube 52a has its control grid connected to terminal 39a of counter G–1; and its plate connected through the solenoid of 51a and a resistor 62 to the positive B supply line 61, while the capacitor 63 is connected between plate and ground. The circuitry involving tube 52b is identical, with of course the terminal 39b of counter G–2 connected to the grid of 52b; and the plate through solenoid of 51b to positive B supply line 61. Further second sets of normally closed contacts, one set in each relay 51a, 51b, are connected in parallel between positive 250 volt line 61 and a controlled line 61b as a common plate supply line to the tubes of matrix K, a controlled line 61c going from 61b to the missing time pulse circuitry T (Fig. 8).

Hence with 39a negative or below cut-off potential, the solenoid of 51a in the plate-cathode circuit 52a is deenergized and the contacts of the matrix control relay 51a closed, so that relays 11a are energized to connect the counter G–1 to the matrix K, closing as well 45a for energizing a start relay R–1 as later described for Fig. 7, and also closing 48a in the reset inhibiting grounding circuit where such is to be used. With 39a, hence the grid in 52a, positive the resultant current flow through the solenoid of relay 51a causes the contacts thereof to open, deenergizing relays 11a to disconnect counter G–1 from matrix K and to open 45a, 48a, and also cutting off the 250 volt plate supply from matrix K and from 61c to the input of circuit T. The appearance of positive or negative potentials on 39b causes a like switching action of counter G–2 relative to the matrix.

*Matrix K (Fig. 3)*

As previously stated the "units," "tens" and "hundreds" digit sections of the matrix K are identical in internal circuitry, now described with reference to the "hundreds" digit section 27 enclosed in the dashed rectangle of Fig. 3. The four-line coded output for a "hundreds" digit is applied through the above described switching circuit to "hundreds" digit matrix section 27, at the control grids of tubes 70, 71, 72 and 73 by input lines 16, 15, 14 and 13 respectively, the line 13 also being connected to the control grid of 74. The cathodes of these tubes (which may be halves of 12AT7 tubes) are directly grounded, ground being a common ground with Fig. 2, and the plates are connected by similar capacitors to ground and by similar resistances to the controlled positive line 61b. Though not shown, the heaters of the tubes here and elsewhere are connected in conventional fashion, one side to ground and the other side to the heater supply secondary in a transformer such as TR–1 in Fig. 2.

With each tube 70—74 there is shown associated one of the like double-pole, double-throw type matrix relays 75—79 respectively, each with solenoid in the plate-cathode circuit, connected between plate and line 61b. The circuits for the tubes 70—74 are then basically identical. However the extreme left hand matrix relay associated with tube 70, functionally is a simple double throw-switch, since one set of contacts is not used. Relay contact switch arms are shown in Fig. 3 all in "normal" positions, which during operation occurs only for the specific cases where neither counter is applied to the matrix or a "zero" potential representation for the hundreds digit is applied from a counter to the control grids of tubes 70—74 according to the code of Fig. 4, that is a negative 15-volt potential relative ground, as explained; in other words for the case where each tube is non-conducting and the corresponding relay is deenergized. Accordingly, where a given tube is conducting by virtue of a potential at ground or positive applied to its grid, the corresponding relay is energized and its contact positions reversed from that of Fig. 3.

The matrix relay switch arm and contact connections apparent in Fig. 3 for the "hundreds" matrix section 27 provide a possible path or closed circuit branch from the lead 69h of the switch arm 75a of the relay 75 (in other words from "demand" terminals 92h or 92t of the IBM input column terminal strip 91, as determined by the hereinafter described floating decimal point switch L) to each of the ten leads 80h–89h connected respectively to the digit terminals 0–9 of the IBM summary punch input digit terminal strip 90, which has a ground terminal connected to ground of the matrix K, and two additional terminals to be described. From the aforegoing description it is seen that for each combination of potentials applied by a counter output set to the matrix input leads 13—16, corresponding to a counter registered digit (as set forth in tabular Fig. 4) a different configuration of matrix relay connections will appear, providing a path from 69h to a corresponding decimal terminal on strip 90.

By way of examples: a registered "zero" "hundreds" digit in applying a negative potential to each grid of 70—74, keeps the tubes cut off, all matrix relays deenergized for the contact settings of Fig. 3, and 69h is then connected to the "0" terminal of 90. A registered "hundreds" digit of 9 applies a ground or positive grid potential to all tubes 70—74 to render the same conducting, thereby reversing all contact positions to connect 69h and the "9" terminal. A registered "5" digit energizes only 75, 76 and 77 to provide a path from 69h successively through the lower contacts of 75, 76, 77 and 79 to the "5" digit terminal.

The internal circuitry of the matrix sections 28 for the "tens" digit and 29 for the "units" digit are identical arrangements with those of "hundreds" section 27 having respectively a set of ten leads 80t–89t and units leads 80*u*–89*u* (corresponding to 80*h*–89*h* of the "hundreds" section), with the leads of each set also connected to a corresponding digit terminal on strip 90, also with the analogous leads **69*t* and 69*u* corresponding to 69*h*, as shown. The input leads 17—20, and 21—24 are connected to grids of tubes situated in the section 28 and 29 respectively, similarly to 13—16 in the section 28**. The grounds of the three sections are commonly connected to the grounds of Fig. 2 switch circuitry and power supply.

On the IBM punch input "column" terminal strip 91 the three terminals **92*h*, 92*t*, 92*u* are used, in conjunction with the digit strip 90, for punching of the three digit, therefore three column, demand data presented by the matrix, the floating decimal point switch L being interposed between 92*h*, 92*t*, 92*u* and 69*h*, 69*t*, 69*u***.

*Floating decimal point switch L (Fig. 3)*

Decimal point switch L comprises three ganged three point switches 96, 97, 98, with the switch arms of 96 and 97 connected directly to **92*u* and 92*t*** respectively, while the normally open contacts R2*a* of read-out relay R–2 (see also Fig. 7) are included in the line 99 from the arm of 98 to **92*h* for purposes to be described. The leads 69*h*, 69*t*, and 69*u* are connected respectively to the central ("1") point of 98, 97, 96, so that with the decimal switch set at "1," i.e., unit multiplier, the three punch card columns assigned for demand data of any period will have punched therein the successive hundreds, tens and units digits actually represented by the matrix relay setting configurations in 27, 28, 29**.

Lead **69*h* is also connected to the "0.1" point of switch 97, 69*t* to the "0.1" point of 96, while the "0.1" point of 98 and also the "10" point of 96 are connected by line 100 to the lead 80*h*, i.e., to the "0" digit terminal of 90. Leads 69*t* and 69*u* are also connected respectively to the "10" points of switch 98 and of switch 97. Thus with L set for "10," terminal 92*h* is connected to 69*t*, 92*t* to 69*u*, and 92*u* to line 100 and therefore bypasses the matrix relays directly to the "0" terminal of digit strip 90. Accordingly the data represented by the matrix settings of sections 28 and 29** are actually punched as hundreds and tens digits, with a zero punched as the unit digit, a multiplication by a factor of 10 by the decimal switch setting, which of course is used where count data of less than 99 is to be expected.

With the decimal switch set at "0.1" for a division by 10 (multiply by 0.1), **92*h* is connected to 100 for bypassing the matrix, 92*t* is set to lead 69*h*, and 92*u* to lead 69*t*, so that a zero is punched in the "hundreds" digit column of the card, the "hundreds" digit represented in matrix section 27 is punched in the "tens" digit column, the "tens" digit represented in 28 is punched in the "units" digit column, and the "units" digit represented in matrix section 29 is neglected. It may be here noted that since the IBM summary punch is wired to look first to the hundreds digit for information (i.e. 92*h***) to begin punching demand data, where contacts R2*a* of read-out relay R–2 are open, the punch will not begin punching the demand data.

*Plugboard N, subpulse stepping relay R–3, time period stepping relay R–5 (Figs. 5, 5a)*

In Figs. 5, 5*a*, there is presented the receptacle-plugboard combination N, sub-pulse stepping relay R–3, time period stepping relay R–5, date-of-year stepping relays R–6 and R–7, and associated elements and circuitry for developing time period data and day-of-year data coordinated with and to be punched into each card at locations between entries of the demand data presented by the circuitry previously described.

Here again, as in the matrix K, the circuitry of Figs. 5 and 5*a*, the circuitry presents its "output" as an "input" to the IBM summary punch not as an electrical potential or current but rather as a physical configuration (or sets of configurations), that is, specific paths (out of possible paths) from each of the date terminals **93*h*, 93*t*, 93*u*, and period terminals 94*t*, 94*u* on the column terminal strip 91 to the digit terminals on digit strip 90**.

The plugboard combination N includes a receptacle disignated N*a* having 60 individual pin sockets arranged in six vertical rows of ten, 1–10, 11–20, 21–30, 31–40, 41–50, 51–60, adapted to receive a plugboard proper with correspondingly arranged pins, such as N*b* appearing in Figs. 6, 6*a*, 6*b*, 6*c*, wired for various connections required by the time interval represented between successive interval signals or pulses in the "B" channel of a given tape, to select an appropriate switch of the sub-pulse relay R–3 for advancing relay R–5 one step per hour of demand data translated irrespective of the time intervals involved; and also to select the appropriate connections of the switches in R–5 to the digit terminal strip 90, and to the period terminals **94*u* and 94*t* on column terminal strip 91**.

The sub-pulse stepping relay R–3 includes at least three like ganged sections of twelve points each, R**3*a*, R3*b*, R3*c* used respectively for a 30-minute, 15-minute and 5-minute time interval periods, and also a stepping solenoid R3*s*. This relay, similar in mode of operation to relays R–5, R–6 and R–7** to be described, is of a type well known to the art, wherein the contact arms are advanced one step for each solenoid energizing pulse, after the pulse has passed. The solenoid R3*s* is connected between the positive 48 volt supply line 56 and the line 126 running to the arm of start relay contacts R1*a* (controlling closure of the R3*s* solenoid circuit to negative 48 volt line 46, see Fig. 7), so that R–3 is advanced one step for each interval of demand data punched for each closure of R1*a* as later detailed. The actuation or pulsing of R–5 however depends upon the connection established between lines 126 and 127. A panel dial is carried on the single shaft of R–3 to indicate the switch arm positions, useable also for an initial manual setting of the switch positions for synchronization with the tape.

The section R3*a* has the alternate points designated 0, 2, 4, 6, 8, 10 commonly connected by a line 128 to socket 28; and its rotating contact arm, commonly with the arms in R3*b*, R3*c* and R5*a* connected to socket 27 by line 127. The section R3*b* has every fourth point, designated 0, 4 and 8, commonly connected by line 129 to socket 29; but R3*c* has merely the first point 0 connected by line 130 to socket 30. Since the period stepping relay solenoid R5*s* is connected between the 48-volt supply line 56 and line 127, and the line 126 from the start relay is also connected to socket 26, a 60-minute plugboard connection 26—27 by-passes R–3 so that each closing cycle of the start relay contacts pulses or steps R–5; while the 30-minute board connection 26—28 through R3*a*, the 15-minute connection 26—29 through R3*b*, and 5-minute connection 26—30 through R3*c* respectively cause every second, fourth and twelfth cycle of R1*a* to pulse or step R–5; that is, corresponding to every hour of demand data in all cases.

Here the switches R3*a*, R3*b*, R3*c* are shown each with diametrically extending double arms, with the twelve points thereof equally spaced by 1/12 of a semi-circle, so that one or the other arm of each is in contact with a switch point throughout a complete shaft revolution. For the 1-hour, ½-hour, ¼-hour and 1/12-hour periods here contemplated (practically speaking, a completely adequate range of choice), the identical rotary switches with 12 points are convenient. However, where switches are used with contacts of number other than 12 or multiples thereof, for example forty, there will be of course four extra points beyond three sets of twelve in R3*c*, wherein accordingly every twelfth point would be tied to 130, and circuitry would be provided for automatic skipping or advance over the extra points as a single step upon one pulse, as is known to those skilled in the art.

The sockets 40 and 31—39 in one vertical column are connected respectively by lines 140 and 131—139 to the 0–9 digit terminals of the digit terminal strip 90 of the IBM machine previously described relative to Fig. 3 and also appearing in Fig. 5. Sockets 31, 40, and 51, are connected respectively to sockets 32, 50 and 52 by lines **131*d*, 140*d* and 132*d*. (Also superimposed on the receptacle in dashed lines between sockets 1 and 31, 13 and 32, 26 and 27, 46 and 50** are the connections wired between corresponding pins on the "60-minute" period plugboard appearing in Fig. 6.)

The time period stepping relay R–5 includes three ganged rotary switches, with electrically distinct rotating switch arms carried on a common shaft, and all here shown with each switch having twenty-four contact points, namely, date advance switch R5*a*, a units switch R5*u*, and a tens switch R5*t*; and also the previously named stepping solenoid device R5*s*, a type known to the art to advance each switch one step or point for each pulsing of the solenoid.

The point numbered 24 in data advance switch R5*a* is connected by line 156 to one side of the solenoid **R6*s* in R–6 as later described; and the arm therein by lines 127, 127*b* to socket 27 and the switch arms of R–3**, so that closure of start relay contact R1*a* is effective to pulse R–6 only when R5*a* is at its point 24, once per twenty-four hours of data or per one revolution.

The sockets 1–24 inclusive in N*a* are connected to contact points 1–24 of the unit switch R5*u* by respective lines 101–124. In the tens switch R5*t*, points 1–9 are commonly connected to socket 47 by line 147; points 10–19 to socket 48 by line 148; points 20–24 by line 149 to socket 49 while the movable contact arm or arms are connected by line 146 to the socket 46. Also the rotating contact arm in the units switch R5*u* and the arm in R5*t* are connected respectively by lines 145 and 146 to the time period terminals **94*u* and 94*t* in the column terminal strip 91** of the IBM machine.

Considering now the time period connections or paths between the peroid terminals **94*u* and 94*t* on the column strip 91 to the digit terminal strip 90** of the IBM punch, the various sets of such possibilities are determined by the wiring connections of the plugboard used.

The boards of Figs. 6, 6A, 6B, 6C are all wired for punching and printing a time period identification for every twelve sets of data intervals, if desired. For the 1-hour, 30 minute, and 15-minute boards it will be noted that pins 46 and 50 are connected, so that the lines **146*a*, 146, 140*d* and 140** bypass the tens switch R5*t* to connect column terminal **94*t* directly to the digit "0" terminal on 90**. This is done since twelve data intervals in these cases occur every 12, 6 and 3 hours, resulting therefore in 2, 4 or 8 periods (each of 12 intervals) per day, so that the period identification data will require a zero for its tens digit, whereas with 5-minute intervals, twelve intervals occur per hour, resulting in 24 periods per day.

In the hour board (Fig. 6) pins 1 and 31, 13 and 32 are wired together, so that at the beginning of the day (beginning of first hour, first period) when the arm in R5*u* is at point "1" and the beginning of the middle of the day (beginning of second period, of thirteenth hour) when R5*u* arm is at point "13," the period terminal **94*u* is ultimately connected, respectively to the digit "1" and digit "2" terminals of 90 (by 145, 101, plugboard 1—31, 131; and by 145, 113, plugboard 2, 32, 132**) so that "01" and "02" can be punched.

In similar manner, as may be traced in the drawings, since the 30-minute board (Fig. 6A) has the pin connections 1—31, 7—32, 13—33 and 19—34, whereby **94*u* is connected to digit terminals "1," "2," "3" and "4" on 90**, when the R5*u* arm is at points 1, 7, 13 and 19, the period data 01, 02, 03, 04 is available to be punched at the beginning of hours 1, 7, 13 and 19 of each day.

The wiring of the 15-minute board (Fig. 6B) with pin connections 1—31, 4—32, 7—33, 10—34, 13—35, 16—36, 19—37, and 22—38 makes available the paths for punching and printing the period identification data 01, 02, . . . 08 when R5*u* is at points 1, 4, 7, 10, 13, 16, 19 and 22 at the beginning of corresponding day hours.

Figure 6:
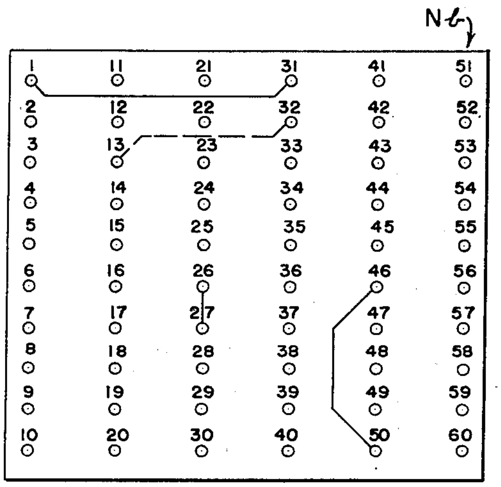
Figure 6A:
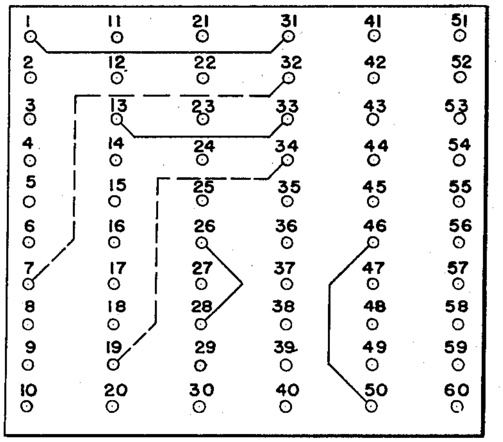
Figure 6B:
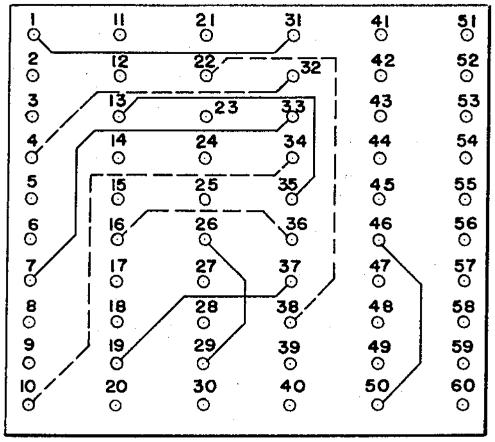
Figure 6C:
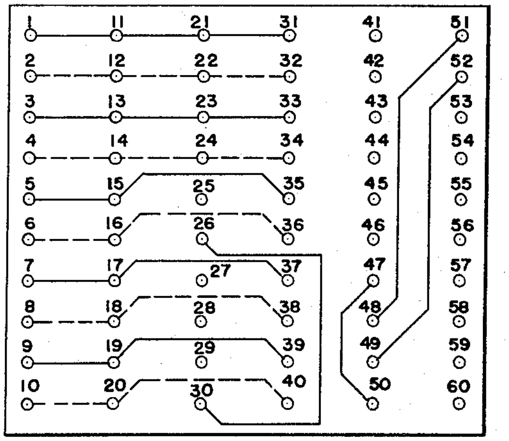

For the 5-minute tape intervals, the board of Fig. 6C has the connections 1—11—21—31, 2—12—22—32, 3—13—23—33, 4—14—24—34, 5—15—35, 6—16—36, 7—17—37, 8—18—38, 9—19—39, 10—20—40, whereby those switch points of R5*u* terminating in a common digit are commonly joined to the like digit terminal of digit terminal strip 90. The board has the further pin connection 47—50, whereby the points 1–9 in the tens switch R5*t* are commonly connected (by 147, 47—50, **140*d*, 140) to the digit "0" terminal; pin connection 48—51, whereby points 10–19 are commonly connected to the digit "1" terminal (by 148, 48—51, 131*d*, 130); and pin connection 49—52, whereby points 20–24 are commonly connected to the digit "2" terminal (by 149, 49—52, 132*d*, 132**), as required to obtain the tens digits "1" and "2" appearing between 10 and 24.

Accordingly paths are available to punch the two digit identifications required for twenty-four periods, i.e., at the beginning of each hour of the day in which twelve intervals of data will appear. In this case, since no board connection is made at pin 46, the period terminal **94*t* may be connected to digit "0," "1" or "2" terminals on 90** as determined by the setting of R5*t*, (simultaneously advanced to corresponding points with R5*u*, as well as R5*a*), so that period data 01–09, 10–19, 20–24 may be punched at the beginning of such corresponding hours. It may be here noted that the IBM punch programming for column data may be selected to punch period identification data at the beginning of every other period as might be desirable in using 80 column cards to cover two periods per card and where space is needed for other data. In such a case, the dashed pin connections on the boards are not actually used, and could be omitted.

For initial setting or synchronization of the time period stepping relay R–5 relative to the tape, the shaft thereof carries a control panel dial indicating contact arm position. There is also included in the relay a norally closed switch contact set opened by energization of the solenoid R5*s*, the arm of which is shown connected to 127. A manual panel switch SW–5 with an "off" position and two contact points has its movable contact arm connected to the D.C. minus supply line 46, one point connected to the fixed contact point of the normally closed relay contacts of R–5, and the other point connected to 127. To minimize arcing, a series capacitance-and-resistance connection is provided between each arm and its associated fixed contact in the said normally closed relay contacts, and switch SW–5 as shown.

By setting the switch SW–5 from neutral to line 127 a single pulse is provided to advance the time period stepping relay shaft and therefor the arms in R–5 one step, whereas by setting to the opposite position the solenoid is automatically pulsed by the make and break action of the relay contacts continually until SW–5 is again opened. This is a convenience for initial synchronization setting of R–5. A similar arrangement is provided for relays R–3, R–6 and R–7.

*Day-of-year relays (R–6, R–7)*

In the date stepping relays appearing in Fig. 5*a*, the first relay R–6 has two rotary switches ganged with insulated rotating contact arms on a common shaft, namely the switch sections R6*a*, R6*b*; while the relay R–7 has three ganged switch sections, with insulated arms on a common shaft, the "tens" switch R7*t*; "hundreds" switch R7*h*; and the end-of-year warning switch R7*e*. The arms of R6*u*, R7*t* and R7*h* are connected respectively to the date terminals **93*u*, 93*t*, 93*h*, on the column terminal strip 91 of the IBM machine appearing in Fig. 3 by lines 153, 154, 155** respectively.

The switch points 0–9 in the units switch section **R6*u*** are connected to "0"–"9" digit terminals of the digit terminal strip 90, by lines 140*a* and 131*a*—139*a* which join 140 and 131—139 for that purpose.

The actuating solenoid R6*s* as previously noted is connected between the positive 48 volt D.C. supply line 56 and the line 156 to the point 24 of the date advance switch R5*a*, so that it is pulsed by closing of start relay contacts R1*a* once for a one step advance in each revolution of the date advance switch.

Since the rotating contact arm of the date unit advance switch R6*a* is connected by 127*b* to 127, the stepping relay solenoid R7*s*, connected between 56 and the solely used point "0" of the advance switch R6*a*, can be pulsed once at a closure of start relay R1*a* for a one step advance of R–7 switches by each revolution of R6*a* and R6*u*.

In the hundreds switch R7*h*, points 0–9 inclusive are commonly connected by line 140*b* (joining 140 and 140*a*) to the "0" digit terminal of the digit terminal strip; points 10–19 inclusive by line 131*b* (and 131*a*) to the "1" digit terminal; points 20–29 to the "2" digit terminal by line 132*b* (and 132*a*); and points 30–36 to the "3" digit terminal, by 133*b* (and 133*a*). In the tens switch the points 0, 10, 20 and 30 are commonly connected to the "0" digit terminal by line 140*a* (and 140); points 1–9, 11–19, 21–29 are commonly connected by lines 131*c*—139*c*, (respectively joining 131*a*—139*a*) to the corresponding "1" to "9" digit terminals of the terminal strip 90, while points 31–36 inclusive are joined to 131*c*—136*c* for connection to the 1–6 terminals in like manner, that is, for example 1, 11, 21, 31 are connected by 131*c* to 131*a*, therefore to 131 and hence to "1" digit, for numbers having like unit digits.

Thus each revolution of the date advance switch R5*a* permits one pulse to advance R6*a* by one point or unit, but the solenoid R7*s* for the date stepping relay is pulsed only once per revolution of R–6 when the arm of R6*a* is at the "0" position; in other words, once for every ten revolutions of the date advance switch R5*a*. Thus, simultaneous rotation of R7*t* and R7*h* through 36 points plus additional units of advance in R6*u* constitute a year's span as may be selected.

Also associated with the solenoid of the date stepping relay R7*s* is a set of normally closed relay contacts in an advance circuit (see Fig. 5B) including a manual panel switch SW–7 (set from an "off" position to two other positions for either automatic advance or manual single step), similar to that described with respect to R5*s* for pulsing the date stepping relay to an initial setting for synchronization, relative to the tape. A similar circuit is provided for R–6 controlled by panel switch SW–6. Index panel dials are similarly provided on the shafts of R–6 and R–7 for indicating contact arm positions.

In the end-of-year warning circuit, the end-of-year warning panel light V–1 is connected between one side of an 115–120 volt A.C. supply and the solely used points 36–37 of switch R7*e*, while the arm of R7*e* is connected to the 115–120 volt supply. For this lamp, of course, other supplies may be used as convenient depending upon the lamp chosen. The lamp accordingly lights as a warning when the point 36 is reached in R7*e* at day 360, and will remain lit after day 370 is reached when operation is stopped as later described.

The switches R6*u* and R6*a* are so arranged that the contact arm in R6*a* will be one point ahead of that in R6*u*; R7*e*, R7*h* and R7*t* for the arms to be on like numbered points at the same time; and R5*a*, R5*u* and R5*t* so that these arms will occur at respective like numbered points at the same time. Whereas as a practical matter with usual switches the contact points are actually circularly equally spaced for a single switch arm, merely for clarity of the drawings, the rotary switches R5*u*, R5*t* and R7*h*, R7*t* and R7*e* are each represented as split in two semi-circles, with a switch shown arm for each semi-circle, to show the position of the actual single arm relative to all the points of a single switch unit. Forty points are shown in the R–7 switches with the span from 0–36 used in R7*h*; and R7*t*; and 36–37 in R7*e*.

Thus, with R–7 initially set at point "0," for a day-of-year from 1 to 9, 93*h* will be connected to digit "0" terminal, for the hundreds arm in R7*h* is at its point "0"; 93*t* will be also connected to "0" digit terminal as the tens arm in R7*t* is at its point "0," but 93*u* will be connected to that one digit terminal corresponding to the setting of R6*u*. Therefore on "day one," "001" will be punched for the date, for "day nine," "009." When R6*u* reaches its point "9," R6*a* is back to its solely used point "0," so that the pulse occurring upon closure and opening of start relay R–1 at the end of the last interval of data for "day nine" (or a day with unit digit 9), pulses or energizes R7*s* thereby advancsing R–7 one step for all switches therein. This of course happens as each ten days are stepped off by R6*u* (or a day number ending in the unit digit "0" is reached where the dating begins from a day other than a decade number).

Considering a year day from 10–99, say 10, the hundreds and tens arms now being on points "1" in R7*h*, and R7*t*, 93*h* will still be connected to "0" digit, 93*t* to "1" digit, and 93*u* to "0" digit, to punch "010." At the year day one hundred, the arms in R7*h* and R7*t* have now passed to their points "10," and the arm of R6*u* is back to point "0"; and since 93*h* is now connected to the digit "1" terminal, with 93*t* and 93*u* connected to digit "0" terminal, the date "100" will be punched.

The connections of the plugboard wiring are not intended to affect the possible paths from 93*h*, 93*t*, 93*u* to the digit terminal strip, but only to affect the operation of the day-of-year relays, by establishing connections from the sub-pulse relay (and from 126 to the start relay contacts R1*a*) to accommodate the stepping action of R5*a* to the time interval between pulses of the tape "B" channel, so that irrespective of the interval used in a given tape, the date advance will be proper.

*Start relay R–1, read-out relay R–2 and non-repeat relay R–4*

In Fig. 7 there appear parts of the internal circuitry of the IBM machine—namely, the contacts of a relay R–IBM interposed between the IBM column strip terminal 95*a* and the positive side of the internal IBM 48-volt supply in the "zero print" circuit; and contacts of relay R–IBM–2 in the "print suppress" circuit, inserted between the positive 48-volt supply and terminal 90*a* on the digit terminal strip while the terminal 95*b*, tied to the negative side of the internal IBM supply, is also connected to the negative 48-volt side of the power supply previously mentioned and described relative to Fig. 9.

The start relay R–1 with three sets of normally open contacts R1*a*, R1*b*, R1*c*, has solenoid R1*s* connected between the aforementioned terminal 95*a* and the line 47 (Fig. 2). Although line 47 is connected to the negative 48-volt D.C. line 46 upon closure of 45*a* or 46*a* by energization of the phase relays, energization and closing of the start relay is subject to the interlock provided by the relay R–IBM which is closed only when the punch is ready by program to accept load information. The contacts R1*a* are connected between line 126 (to Figs. 5, 5*a* as previously described) and the negative 48-volt supply line 46 for pulsing the relays R–3, R–5, R–6 and R–7.

The movable contact arms of R1*b* and R1*c* are both connected to the positive 48-volt supply line 56 with the fixed contact of R1*b* connected by line 159, through terminal 90*b* on the IBM digit terminal strip 90, to internal circuitry of the IBM machine as an interlock for applying 48-volts within the IBM machine upon closure of R1*b* to prevent operation of the IBM punch keyboard.

In the nonrepeat relay R–4 the solenoid R4*s* has a center tap connected to line 47 and one end connected by line 160, through the terminal 90*a*, to contacts R–IBM–2. The relay R–4 also includes a set of contacts R4*a* with the movable arm therein connected to the fixed contact of R1*c*, while the normally open fixed contact in R4*a* is connected to one end of R4*s* to provide a selfholding coil. The other fixed or normally open contact in R4*a* is connected to one end of the solenoid R2*s* of the read-out relay R–2, the other end of which is connected to line 46. The normally open read-out relay contacts in R2*a* are connected in the line 99 as previously described with respect to Fig. 3, to present an open circuit to 92*h* when R2*s* is deenergized, and therefore prevent operation of the punch for reading out demand data.

The non-repeat relay may also include the normally closed contacts R4*b* with one side grounded and the other side connected to the line 40 for a counter reset inhibiting function where such is desired as previously described with respect to Fig. 2.

The IBM punch is programmed to close R–IBM–2 after the three decimal digits of demand data have been punched to energize R4*s*, thereby opening the normally closed contacts in R4*a* to deenergize and open R–2. This removes the connection of 92*h* through the matrix—that is, provides an open circuit so that there can be no repunching of the data just punched. This same energization of R4*s*, when R–1 is energized, closes the normally open contacts of R4*a* to energize the selfholding side of R4*s* connected therewith. This selfholding action is terminated upon opening of the contacts in R–1 to reclose the normally closed contacts in R4*a* readying R2*s* for energization under otherwise appropriate conditions.

*Initial phasing circuit H (Fig. 8)*

In the representation of the phasing circuit, the output line 200 from the time interval pulse amplifier is connected directly to the input line 201 of the "B" channel in the counter G–1, and through the normally open contacts of a relay R–8, to the input line 202 to the "B" channel of counter G–2. For operation of the relay R–8 in the manner hereinafter described, its solenoid R8*s* is connected from the plate of 2D21 Thyratron tube 203 or the like to line 218, to which a potential 120 volts positive to ground is applied by normally closed switch contacts 219*a* from line 220. The potentiometer 204 connected from 218 to the common ground line 205, through fixed resistor 206 applies an adjustable potential to the shield grid of the Thyratron, the cathode of the Thyratron being grounded to 205.

The potentiometer 208 between the line 200 and ground, and a second potentiometer 209 between the arm of 208 and ground provide an adjustable network for applying an input pulse through line 210 and the resistor 211 to the Thyratron control grid. An adpustable negative grid bias for the Thyratron is provided by potentiometer 213 connected between ground line 205 and the negative 110 volt D.C. supply line 214 with its arm connected through resistors 215, and 211 to the control grid. The D.C. voltage of lines 214 and 220 may be taken from one of the counters.

Before any pulse has been applied in 200 the Thyratron is non-conducting and R8*a* is open, so that the positive side of the output of the "B" pulse amplifier E–2 is applied only to lines 200 and 201 at the beginning of operation. Thus the first time interval pulse supplied by pulse amplifier E–2 through 200 is withheld from line 202 and counter G–2, but is applied directly by line 201 to the "B" channel of counter G–1, which thereupon assumes the counting function. However, the first pulse applied to the Thyratron control grid causes the tube to become conducting and thereafter remain conducting by typical Thyratron action, energizing R–8 and closing R8*a* (also opening R8*b*), so that all subsequent pulses applied at 200 are applied to the "B" input channels of both counters G–1 and G–2.

Since the trigger circuits of the two counters are adjusted, in pulse slope sensitivity so that one counter is stopped on the positive slope of a pulse while the other is started on the negative slope of the same pulse, and therefore on the next pulse the one is started on the negative slope and other stopped on the positive slope, the counters count during alternate periods or intervals defined by successive time interval pulses derived from the tape "B" channel.

The contacts 219*a* are part of a "stop" panel switch 219, including similar contacts 219*b*, spring loaded closed, as a push button type. Thus upon opening of the stop switch contacts 219*a* even momentarily, the plate potential being once removed, the Thyratron is cut off not only until stop switch contacts 219*a* are again closed, but also until a pulse is applied to fire the Thyratron.

At this point it may be noted that a heater supply secondary of the transformer TR–1 (also appearing in Fig. 2) has one side grounded and the other side connected by the branched line 230 to the ungrounded heater leads of the Thyratron and of other tubes of the drawings, and also commonly to other points in the circuit (as indicated by the reference characters "X"). Also the circuits of Figs. 2, 3, 8 and 9 are commonly grounded. Now as the normally closed contact pair R8*b* of the relay R–8 in the initial phasing circuit is connected in series with a white "initial phasing" panel signal lamp from line 230 to ground, the lamp 232 remains lit until the first time interval pulse passes pick-up D–2 and the contacts R8*a* are closed upon Thyratron firing by the first impulse from amplifier E–2.

*Motor control circuit and start up control (Fig. 8)*

The tape transport motor M, is powered by a 115–120 volt A.C. source through lines 223, 224 controlled directly by normally open contacts R9*a* of the motor control D.C. relay R–9, upon energization of the solenoid R9*s*, from the 48 volt D.C. lines 46—56. It will be observed that the "start" panel push button switch 228 (spring-loaded open) and the switch contacts 229*a* are connected in parallel between D.C. negative line 46 and the normally closed contacts 219*b* of the "stop" switch, which in turn is connected by 225 in series with solenoid R9*s* to positive D.C. line 56; and also that there is further connected in parallel with switches 228, 229*a* the series branch comprised of the normally open contacts R9*b*, contacts R10*b*, and normally open contacts R11*b* and R12*b*, respectively of the motor control relay R–9, the dual time pulse latching relay R–10, missing time pulse relay R–11 and data interlock relay R–12. The panel switch 229, including the second contacts 229*b*, similar to 229*a*, is set to an "open" position for automatic continued normal operation, and to "closed" position for manual operation, that is for testing, maintenance or adjustment operations on the system.

From the aforegoing description, it is apparent that, with 219*b* in normally "closed" position, closing of 228 or 229 will energize and close R–9 to cause tape transport motor to operate, irrespective of the condition of R–10, R–11, or R–12, as in starting operations or normal motor operation generally. Further, once normal operating conditions are attained and R9*b*, R10*b*, R11*b* and R12*b* are closed, operation of the transport motor will continue although switches 228 and 229 are open, until stop switch 219 is opened, deenergizing and opening R–9; or until R10*b* by a dual time pulse, or R11*b* by a missing time pulse, or R12*b* by a data interlock function, is opened, thereby releasing R–9 as hereinafter explained.

The switch 229 includes contacts 229*b* connected in series with a panel lamp 230, say green in color, between the heater line 230 and ground, so that a panel lamp indication is apparent when the system is set for "manual" control. Circuitry details for reversing the motor, as may be desirable for tape rewind, or over-all total demand or load impulse count check, is omitted for clarity of the drawings since well known to those skilled in the art.

*Dual time pulse sensing circuit* (*Fig. 8*)

In the dual pulse sensing circuit the latching relay R–10 includes a reset solenoid R10*r* whereby upon energization the contacts R10*b* are set to a closed position and R10*a* to position connecting line 230 to line 235; and also the current sensitive tripping solenoid R10*t* (previously described relative to Fig. 2) which trips or shifts those contacts to opposite settings, that is, respectively to open position and for connection of 230 to 236. The reset panel switch 270 includes spring loaded contacts 270*a* interposed between line 230 and line 271 to the ungrounded end of reset solenoid R10*r* for resetting R–10.

The shunting resistance 59 provides adjustment of the current value in 56 at which R10*t* is energized to open R10*b*, so that tripping will occur when both sets of phase relays 10*a* and 11*a* would be simultaneously energized—therefore connected in parallel to draw abnormal current in 56 as would occur should a dual time pulse condition arise to close both matrix control relays 51*a*, 51*b* simultaneously. Accordingly, a dual time pulse causes solenoid R10*t* to open R10*b* and stop the tape transport motor.

*Missing pulse sensing circuit* (*Fig. 8*)

In the missing pulse sensing circuit the ordinary potential sensitive, non-latching relay R–11 when deenergized permits its contacts R11*b* to open and stop the motor in the manner previously described by deenergizing R–9 to open R9*a*. The solenoid R11*s* is connected in series between the plate of tube 244, e.g., half of a 12AT7 type, and a supply line 245 from a source 110 volts positive to ground, a resistor 246 being in parallel with the solenoid, while the cathode and one side of the heater are directly grounded to line 248, by-pass capacitor 249 being connected between the plate and ground.

The line 61*c* from the matrix control relay is connected through the resistor 251 to the control grid of the tube, to which a strong negative bias is supplied through resistor 252 from a bias potential source 214, 110 volts negative to ground. Also, there are connected in parallel between the control grid and ground the potentiometer or variable resistor 254 and capacitance 255, the arm of the potentiometer 254 also being connected to ground. Hence an alternate closing of the matrix control relays 51*a* and 51*b* in normal operation applies the positive 250 volt potential of line 61 (Fig. 2) in gated fashion to 251 for charging capacitor 255. An adjustable resistance discharge path for the capacitor is provided by 254, for determining the discharge rate as required by the time interval of a particular tape, in order that the tube 244 remain conducting for energizing R–11 as long as the time impulses derived from the tape arrive at proper intervals. However, when a time impress is missing from the tape, or is not effective in applying a control pulse to the selector circuitry, the consequent omission of a gated application of potential to capacitor 255 permits the grid potential to drop below cut-off, deenergizing R–11 to stop the motor.

*Data interlock sensing circuit* (*Fig. 8*)

The configuration of circuit components in the data interlock sensing circuit involving the interlock relay R–12 and the tube 259 (again half of a 12AT7) is similar to that described relative to 244 of the missing time pulse sensing circuit with like bias and plate potentials at 214 and 61; hence, it will be no further described except to note that the normally open contacts R4*c* of the non-repeat relay are interposed between resistor 261 (analogous to 251) and a potential source 250 volts positive relative to ground.

Here again the adjustment of the variable resistance or potentiometer 264 sets the discharge time of capacitor 265, so that in regular operation 259 conducts and R–12 is energized as long as the periodic closure of R4*c* continues at proper intervals; but upon failure of a proper closure of R–4 to apply the 250 volt charging potential to 265, tube 259 is cut off by discharge of 265 through 264 to deenergize R–12, open R12*b* and stop the tape transport. Should the condition occur that data of any character is missing, not available to the punch, at the time the punch is programmed to receive it, the punch stops, and cannot receive and punch load data presented by a counter. Then, since R4*c* is closed only upon energization of R4*s* by a pulse from the IBM machine upon completion of a load data punching operation, this sensing function comes into operation.

*Trouble analyzer signal lamps* (*Fig. 8*)

An "initial phasing" indicator panel lamp 232 and normally closed contacts R8*b* are connected in series between 230 and ground, so that the lamp is lit until the initial phasing circuit relay R8*a* is energized to apply the time interval pulse of E–2 to the counter G–2. The panel lamp 233 for indicating whether the system is on "automatic" or "manual" setting of 229 has been previously described relative to the motor control circuitry.

The "dual pulse" indicator panel lamp 239, connected between line 236 and ground, accordingly is controlled by the dual pulse relay R–10, being lit when R–10 is tripped to indicate improper operation due to a dual time pulse.

Two further trouble analyzer or panel indicator lamps 278 and 279 are provided for a missing time pulse or data interlock malfunction respectively, and further lamp interlock circuitry to ensure that only that lamp will be lit which is indicative of the initial cause of trouble, since stopping of the tape will also cause deenergization of R–11 and R–12. To this end a pair of like latching relays R–14 and R–15 are provided (both shown in tripped condition) having respective voltage sensitive tripping solenoids R14*t* and R15*t*, and resetting solenoids R14*r* and R15*r*. It will be noted that contacts R14*a* and missing pulse lamp 278 are connected in series between line 235 and ground, and so also R15*a* and data interlock lamp 279, so that lamp power is available from line 230 only when R10*a* is set to line 235, that is, while R–10 is untripped. Hence after a dual time pulse occurs, tripping R–10 to light the dual pulse trouble lamp 239, neither 278 nor 279 can light.

The lines 272, 273 provide 115–120 volt A.C. for operation of the relays R–14 and R–15; the reset solenoids, in parallel between 273 and 275, being controlled by normally open contacts 270*b* interposed between 275 and 272 for energization upon closure of the reset panel switch 270. The tripping solenoid R14*t* is connected by 277 and the contacts R15*b* to line 273, and by line 240 to one fixed point of R11*a* in the missing time pulse relay, the arm of which is connected by line 260 to the arm of R12*a* in the data interlock relay. Trip solenoid R15*t* in similar manner is connected by 276 and contacts R14*b* to 273 and by line 262 to one fixed contact of R12*a*. The other fixed contacts of R11*a* and R12*a* are joined to 272.

The operational conditions of R–14 and R–15 are similar, that is, when tripped R14*a* is closed and R14*b* open, and R15*a* closed and R15*b* open. When the missing pulse relay R–11 is energized, R11*a* is set to line 272, so also R12*a* when the data interlock relay is energized. Assume now an established normal operating condition with R–14 and R–15 set, and both R–11 and R–12 energized. When a time pulse is "missed" and R–11 is deenergized to stop tape transport, as previously described, setting R11*a* to 240; so that (with R–12 still energized) the circuit of R14*t* is completed from 273 to 272 through R15*b*, 277, R14*t*, 240, R11*a*, 260, R12*a*, thereby tripping R–14 to close R14a and light 278. Since R14b also is opened R–15 cannot be tripped and 279 cannot light irrespective of any subsequent events until proper restart. In similar manner should deenergization of R–12 first occur, setting R12a to 262, R15t is energized from 273 to 272 through R14b, 276, R15t, 262, R12a, 260, R11a, to trip R–15 and light 279; and in opening R15b, to prevent tripping R–14 and lighting 278.

*Power supply circuit (Fig. 9)*

A conventional power supply is shown in Fig. 9 for the various 48 volt D.C. circuits previously described. The two lines 290a, 290b from an external 115–120 volt A.C. supply indicated at 290, including the power switch SW–1 and fuses 291 supply the parallel primaries of two like transformers TR–3 and TR–4 and run through to the terminal block 292 for connection to 115–120 volt A.C. lines such as 272, 273. The "power-on" panel signal lamp V–2 is across the lines beyond the fuses. The secondaries of the transformers, each tapped at one end for nominal 24–36 volt outputs, are connected respectively across the diagonals of full wave dry type rectifiers 293, 294. For a 48 volt output, the negative corner of 293 is connected to the positive corner of 294. To complete the series rectifier circuit, the positive corner of 293 is connected through ammeter 295, shunted by shunt resistor 295a, to the positive line 56 at the terminal strip, while the negative corner of 294 is connected to the negative line 46 at the terminal strip, the filter capacitor 297 being connected with polarity as shown between the negative corner of 294 and positive corner of 293. For convenience in adjustment to desired output, the voltmeter 298 and the series connected resistor 298b are placed between terminals for 46 and 56.

*Operation*

The data for a particular consumer or consuming device, as the case may be, is obtained at an appropriate installation of a magnetic tape recording kilowatt-hour meter by setting the clock device at correct time, setting the same for producing interval pulses at the desired time intervals, and then starting the recording. The date and precise time for start of measurement recording must of course be noted and preserved, so also the meter scale constant, determining the actual measured energy corresponding to each load pulse impressed on the tape by the particular meter. For greater accuracy such constant is selected so that the energy consumption to be expected in any one interval of the measurement will use the greater part of, but not exceed the capacity of the counter and matrix combination as affected by the range of the electronic multiplying and dividing circuit F, where used. (The duration of measurement can be quite extended since a single 600 foot five inch diameter reel of magnetic tape can accommodate a set of data of more than 3000 intervals of 15 minutes each.)

After completion of the measurement, the tape is inserted in the playback or tape transport mechanism of the translating apparatus, the multiplying and dividing circuit is set to bring the tape count within the limit of the counter capacity if necessary and the decimal point switch L set to give the appropriate value to the matrix output as required by the meter constant or the setting of circuit F, or both, to give an input to the IBM machine in terms of desired units.

Assume, for a specific example, that the fifteen minute interval tape represented in the drawings was produced by meter at meter location designated as "1" on the premises of a customer identified as "987," with a meter scale constant of 1 (i.e., one load pulse is applied to the tape for, say, each kilowatt-hour); that it is known that no 15 minute interval will involve energy consumption exceeding the matrix or counter capacities; and that twelve intervals of data (load data of three hours) are to be punched into each card, with three columns of the card being alloted to each load entry (hence the entry ranging from 000 to 999).

The floating decimal point switch is set at "1" and the circuitry F set for factor 1 to pass load pulses unchanged in number. A plugboard Na (as Fig. 6B) wired appropriately for the 15 minutes time interval of the tape and for the desired period identification data to appear on a card is inserted, with the practical requirement of at least one period number included per card, whereby a group of cards translated from a given tape (having each day's data on a plurality of cards) may be collated or restored to proper sequence, should they by accident be disordered. The sub-pulse relay, period relay and day-of-year relay panel dials are synchronized corresponding to the known time of the beginning of the tape record. For the tape represented in the drawings, the original record of which began at 10:15 a.m., February 1 (day-of-year 32, beginning of the sixth 15 minute interval in the fourth three-hour period of the day, a second 15 minute interval in the clock hour). R–7 would accordingly be set at switch point 3 aptly indicated as "30" on a switch dial for the shaft of R–7; R–6u at a dial indication "2"; R–5 switches for the hour of the day at point "10" and R3b at point "6" for the interval about to be counted in the fourth three hour "period" of the day. The IBM punch is of course readied, and programmed in manner appropriate to the sequence in which load data, day-of-year data, time period data, and customer identification or other classification data are to appear in the columns of the punched cards, and in which other of the previously noted functions of the IBM machine are to occur. After the IBM machine and other circuits are warmed up, initial date, time period and customer identification data are manually punched through the IBM keyboard into a first card.

For example, allotting card column 1 to the identifying data for a meter on the customer's premises, and columns 11, 12, 13 to the customer's identification data number, as the fixed and constant data for all related cards; and columns 5, 6, 7 to day-of-year, and columns 20, 21 to period identification data; the first card is manually punched with "1" in column 1, "032" in columns 5, 6, 7, "987" in columns 11, 12, 13 and "04" in columns 20, 21. Columns 2, 3, 4, columns 8, 9, 10, columns 14, 15, 16, columns 17, 18, 19 are then conveniently available for the first four load data entries, and groups of successive three columns after column 21 for the remaining eight of the twelve load data entries to be contained in each card, which here will be taken without spacing through column 45 for the last eight data entries. The card is then positioned for the tape example to be punched at columns 25, 26, 27 (the columns allotted to the sixth interval) for the data in the first interval on the tape, 10:15–10:30 a.m. Thereafter the specific starting operations can take place.

Assuming that the controls of the amplifier units, the control resistor R–59 of the dual pulse sensing circuit S, and resistors 254 and 264 controlling the time network of the missing pulse sensing and data interlock circuits, T and U, and the control resistors or potentiometers of the initial phasing circuit H have been properly set by preliminary trial operation or experience, and that the manual reset switch (panel control button) of both counters has been actuated, the stop switch 219 is pressed to ensure that the Thyratron is non-conducting and R8a open in the initial phasing circuit, lighting panel lamp 232. Reset switch 270 may now be closed to ensure resetting of the dual pulse relay R–10, so that panel light 239 is out; and also to reset latching relays R–14 and R–15, but the resetting of the latter relays is not effective at this point since capacitors 255 and 256 in circuits T and U are not yet charged. The panel start button of switch 228 is closed and held closed (or 229 is set to "manual" operation) for a few moments to give capacitors 255, 265 an opportunity to charge, as indicated when pressing reset switch 270 causes extinguishment of all trouble analyzer panel lamps including the initial phasing lamp (except the "manual" lamp 233 where switch 229 is used), and then 228 is released (or 229 set to automatic where used in place of 228 in starting) and the data processing proceeds automatically.

In the starting operation just described, when the tape transport is started, the first time interval pulse derived from P–1 in the tape "B" channel, as the input at line 200, is applied directly to line 201 as the input to the "B" channel or counter G–1 to start the same and to the control grid of the Thyratron, but not to the input line 202 to the "B" channel of counter G–2, since R8*a* is open. However, the first pulse causes firing of the Thyratron to energize R–8 and close R8*a*, so that all succeeding interval pulses are applied to both counters as previously described. Because of inherent slightly delay in closing R8*a*, the first pulse has passed before 202 is also connected to 200. The lamp 232 goes out with the energization of R–8. Counter G–1 then proceeds to count the tape channel "A" load pulses (L–1 to L–5) for the first interval (P–1 to P–2) of the tape record.

At this point of time (Fig. 2) neither counter is as yet switched into the matrix K, since both counter terminals 39 are positive as a result of an initial resetting, and therefore both tubes 52*a*, 52*b* are conducting and relays 51*a*, 51*b* are energized and open. Therefore not only is neither of row 11*a*, 11*b* of the phase relays energized, but also the positive 250 volt supply is withheld from line 61*b* (to the matrix plate circuits) and from 61*c* (to the grid and timing network of missing pulse circuit T). Further (Fig. 7) though relay R–IBM is closed, start relay R–1 is deenergized and therefore R–2 open since neither of contacts 45*a*, 45*b* of the phase relay rows are closed. Also R–4 is deenergized so that R4*c* is open and the positive 250 volt supply is withheld from the grid and timing network of data interlock circuit U.

When the second interval pulse P–2 arises from the tape "B" channel at the end of the first interval of recorded load data, it stops the first counter and starts G–2, since R8*a* of the initial phasing circuit is closed. The stopping of the counter G–1 gives rise to a negative potential at counter terminal 39*a*, cutting off 52*a* to deenergize and close phase control relay 51*a* (52*a* remaining energized and open), thereby energizing the row of phase relays 11*a* to apply the counter output to the matrix and supply the matrix plate voltage through 61*b* to set the matrix relays to a configuration representative of the G–1 counter output (here "005," i.e. "0" in the hundreds matrix, "0" in the tens matrix, and "5" in the units matrix) as previously described. Closure of relays 11*a* in closing 45*a* completes the circuit through 47 to energize and close R–1, thereby closing R–2 for read-out of the matrix ouptut by the IBM machine, the closure of R1*b* signalling to the IBM punch the readiness of the matrix for read-out, and closure of R1*a* pulsing the sub-pulse relay R–3 for a one point advance to point 7 after the pulse has passed. Closing of 48*a* inhibits reset, where this expedient rather than automatic reset is used. The closure of matrix control relay 51*a* also applies the 250 volt supply through 61*c* to capacitor 255 in circuit T to at least partially charge the same.

The read-out of the matrix and punching and printing of the interval load data (005) into the card at columns 25, 26, 27 having been completed, the pulse generated by internal application (in the IBM punch) of the 48 volt supply to terminal 90*a* energizes R–4 to move R4*a* to relay self-holding position, opening R–2 and closing R4*c* to apply charging potential to capacitor 265 in circuit U. Repeat punching then is prohibited as previously noted. Where automatic internal reset of the counters is not used, the opening of R4*b* in removing the ground of terminal 38*a* resets the counter. However, for the preferred use of the automatic reset feature of the described counter models, the counter reset circuitry is adjusted as required for the read-out operations to be completed, for automatic reset just after the card punching and printing operations are completed, and thereby change the potential of 39*a* positive, rendering 52*a* conducting to open 51*a*, and deenergize phase relays 11*a*. This also marks the end of a charging pulse to capacitor 255 by opening of relay 51*a*, and of the pulse to 265 upon opening of R4*c* caused by deenergization of R–4 by opening of 45*a*. The start relay R–1 is also deenergized and opened, and hence R–2 remains deenergized although R4*a* is now connected to R2*s*.

The counting of the second interval data (L–6 to L–14) assumed by the counter G–2 upon stopping of G–1 proceeds during the read-out operations from G–1, and all the operations of circuitry described for the first interval count similarly occur after G–2 counter teminal 39*b* becomes negative upon the third time pulse P–3 from the tape "B" channel terminating the second interval (P–2 to P–3) count (of L–6 to L–14) by G–2 and again starting G–1, with of course the exception that the matrix control relay circuitry involving tube 52*b* and relay 51*a* now functions to energize phase relays 11*b* to apply the G–2 output through the matrix to the IBM punch, with closure of 45*b* closing R–1, 48*b* (where used) inhibiting reset, and 51*b* applying the charging potential to capacitor 255. The load data of the second tape interval (P–2 to P–3) is thus punched in columns 28, 29, 30 as 009. The pulsing of R–3 in this counting cycle then effects another one point advance to point 8.

When the pulse P–4 occurs thereby stopping G–1 to terminate the count of the third interval P–3 to P–4 (containing L–15 to L–17) which ended at 11 a.m., the circuitry operations described for the first interval counting by G–1 again occur. However since R–3*a* is on point 8 at the time R–1*a* closes and because of the plug board connection 29—30 the sub-pulse 15-minute section R–3*b* is functional, R–5 as well as R–3 is pulsed so that after the pulse passes all switches in R–5 advance from point 10 to point 11, indicative of the hour. In columns 31, 32, 33 the load data count "003" is punched. Such alternate counting continues until the tape translation is completed, with a pulsing of R–3 for each interval, and a pulsing of R–5 for advance at the end of each interval corresponding to the end of a clock-hour.

After a few time intervals of data have thus been read, the charges on capacitors 255 and 265 are brought up to a level where the regular pulsing maintains the charge, indicated by the fact that a closure of reset switch 270 (after tape transport is in operation) as noted above, extinguishes all panel lights of the analyzer system W, whereupon the start button 228 may be released (or switch 229 set for automatic operation). The operation may then proceed automatically with continuous tape transport subject to the surveillance of the trouble sensing and analyzing circuitry explained in the detail description thereof.

With respect to the starting setting of the sub-pulse relay, it is noted that its position is immaterial where the one hour interval plug board is used, since through connection 26—27 each closure of R–1*a* pulses R–5 directly for hour advance. Further when R3*a* is to be used all odd numbered points are equivalent as a setting for a half-hour interval tape started on interval "1" (i.e. where the tape measurement starts on an even hour; and all even points, for interval "2," with the tape measurement started on a half-hour. Analagously in R3*b* points 1, 5, and 9; 2, 6, and 10; 3, 7, and 11; and 0, 4 and 8 are respectively equivalent groups as settings for the first, second, third and fourth quarter hours of the clock hour in which the first tape interval of load data occurs. Such setting may be facilitated by use of separate appropriately marked dials changed on the sub-pulse relay shaft for the specific tape intervals. Likewise for convenient visual reference, dials may be changed on the shaft of R–5, having in addition to twenty-four minor divisions, major divisions corresponding to the periods.

Thus up to the third pulse from R1*a* (following upon the 11:00 a.m. pulse P–4) the initial setting within R–6 and R–7 is preserved, holding ready the date configuration "032"; and so also the initial setting of R–5 at point 10, which holds the "04" period configuration available. After the third R–1*a* pulse advances R–5 to point 11, period data is no longer available since there is no plugboard connection for point 11 (nor for point 12) of R5*u*. In like manner, when the seventh R–1*a* pulse occurs, R3*b* being on point "0," R–5 is pulsed to advance R–5 to points 12, where period data is not yet available. However, the lack of period data configurations is of no consequence, since the card at hand is intended to carry data for the whole fourth three-hour period of the day ending at 12:00 noon. In the columns 34–45, are entered 019, 000, 012, 006, for the 15 minute intervals ended respectively at P–5 to P–8 inclusive as shown in Figures 1A–1B, thereby filling the columns intended to be used in the initial card.

After the load data 006 is punched in columns 43, 44, 45, the last columns intended to be used, the IBM programming advances a new card to the punch, and directs the machine to pick up the meter location data ("1") in column 1 of the preceding card, which is immediately punched into column 1 of the new card. The first interval of load data (ending with P–9 on the tape) counted by G–2 and available in the matrix circuits is read out, and punched as 006 in columns 2, 3, 4, the pulsing of R–3 advancing R–3*b* to point 2. Immediately as programmed, the IBM punch reads and punches the "032" day-of-year configuration (still prevailing by the unchanged settings of R–6 and R–7) into columns 5, 6, 7, and then punches the second load entry (005) counted by G–1 for the interval ending with P–10 into the card. The programming then directs the punching in columns 11, 12, 13 of the customer identification data (987) picked up from the preceding card; and thereafter the load data (002) of the third interval and (003) of the fourth interval of period 05 to be punched in columns 14, 15, 16 and 17, 18, 19 respectively, whereupon by the eleventh R–1*a* pulse (corresponding to 1:00 p.m. of the original measurement), with R–3*b* being on its point 4, R–5 is pulsed to advance to its point 13, for which there is a plug-board connection (13—35) for the period data "05," which is now ready and waiting acceptance by the IBM machine for punching. The programming immediately directs the machine to pick up and punch in columns 20, 21 the available period data (05). Then as programmed the load data of the intervals 5–12 of the "05" or fifth three-hour period are punched respectively into successive groups of three columns, as before. R–5 will continue to be advanced one point as every fourth R–1*a* pulse finds R–3*b* on a 0, 4 or 8 point.

Similar sequences of operation occur, the date data being held constant, until the last interval of load data for February 1 is counted at the end of period 8, that is for the twenty-fourth hour. Since R–5 has been advanced to its points 24 at the end of the twenty-third hour, at the end of the last interval of the twenty-fourth hour of the day, the pulse from R1*a* pulses R–6 to advance R6*u* to its point 3, so that the configuration "032" is available for acceptance and punching on the eight cards which will contain the eight period load data of February 2; and at the same time in pulsing R–5, advances its switches to points 1, for beginning the cycle of period data presentation in accordance with connections on the board of Fig. 6B.

Since the day-of-year and period data during normal operation is always ready and waiting for punching, the IBM programming provides for punching each at appropriate columns immediately after punching of some preceding load data entry on the card, with no possibility of hold up of the read-out of a succeeding load count, so that the entire process may proceed at a very rapid rate.

By way of showing further flexibility of the system, assume now that in the above example involving 15-minute intervals, twenty-four intervals of data (two "periods") are punched on a card. The same plug board of Fig. 6B may be used for each day's card sequence identification by a single period entry for each of the four cards now needed per day, merely by programming the IBM machine to read out period data say near the beginning of each card. Accordingly the cards will be numbered "01," "03," "05" and "07," an adequate sequence identification, the data offered by the dotted line connections of Fig. 6B being ignored. However, to have the cards numbered from one to four, the board of Fig. 6A could be used with its 26—28 connection changed to 26—29.

The day-of-year data of course may take the form of day-of-test data if so desired, by setting the switch dials of R–6 and R–7 accordingly for "day one" rather than to the number of the day-of-the-year at the beginning of operation for a given tape. In any event, where a given tape will carry beyond 360 days, the end-of-year warning lamp V–1 lights as R7*e* reaches switch point 36 as noted. Should the operation be permitted to continue, at the end of day 369, when R7*h* advances beyond its point 36, since the IBM machine finds an open circuit at column terminal 93*h* for the date to be punched, it does not punch and advance, but stands at the column assigned to the first date digit in the programming. Therefore relay R–IBM remains open; the next time interval of load data cannot be read out and punched; and the consequent failure of R–IBM–2 to pulse relay R–4 and close R–4*c* results in skipping a charging pulse for capacitor 265. This operates the data interlock circuit U to stop the tape transport, and prevent erroneous dating of more than a few days' cards. The fact that the warning light is yet lit, in consequence of R7*e* stopping on point 37, indicates then the reason for the stoppage.

The circuitry for automatically providing date and period identification of load data cards through the use of a day-of-year number is simpler than, and for practically all applications the identification quite as convenient as, that involved in the use of month and day-of-month type identification; but the broad invention comprehends the use of the latter type identification and circuitry therefor, which would of course require the use of four card columns rather than three as here presented. Further where an independent variable is to be represented by a single continually increasing decimal number, the circuitry of Figs. 5, 5*a*, Fig. 6 and the type of plugboard wiring networks may be accordingly modified, for suitable identication of each card, and for changing the increment of the independent variable to that used on a given tape for measurement purposes.

Another point of flexibility of the present system, pertinent even to the character of data representation considered in detail relative to the circuitry of the drawings, is the fact that with a tape having say 60-minute intervals in the "B" channel, the data of the "A" channel may be read out at any desired shorter intervals by proper placement of a suitable number of pick-up heads relative to the "B" channel path of the tape.

For example, where 15-minute read-out is desired from the tape, four parallel-connected pick-ups could be used, equi-spaced along the tape, the spacing being one-fourth of the distance between adjacent one-hour impressions on the tape "B" channel. Thus a tape "B" channel impression encountering the first pick-up would start counter G–1, at the second pick-up would start G–2 and stop G–1, at the third would start G–1 and stop G–2; and in arriving at the fourth (at the same time the second "B" channel impression arrived at the first pick-up) would stop G–1 and start G–2, just as the second tape "B" channel impression would in the absence of the extra pick-ups.

Also it should be noted that the "B" channel pick-up may be shifted lengthwise along the tape from a position directly across the tape from the "A" channel pick-up, so that although the data is still read out in intervals of the same time duration as the spacing of the "B" channel impressions, the translated load data is shifted timewise out of phase from the timing of the original record. By this simple expedient permitted by the flexibility of the system, the tape may be analyzed more closely for unusual demand events that might be missed when the load data is merely translated in phase with the original time impressions.

The counters and the rest of the system beyond the amplifiers E–1 and E–2 would operate in response to the pulses out of E–2 precisely as previously explained, with of course a 15-minute plugboard being used. However, the accuracy of day and period identification would be dependent upon actual accuracy, uniformity in linear spacing of the "B" channel impressions on the tape.

To sense a count likely to exceed (or exceeding) the utilized capacity of the counters, here for only three digits, one or more of the 4-line coded output lines for the highest order digit used (or for the unused next highest order digit) could be applied to the grid of a corresponding vacuum tube having in its plate circuit a relay in turn controlling the tape transport control relay R–9 and a trouble analyzer lamp, after the fashion of R–10, –11, –12; so that a positive potential appearing in the 4-line code output line for a predetermined value (indicative of a count about to exceed capacity), will stop the tape transport.

For extremely high speed operation, where it is desired to use a punch of the character of an IBM Model 523, which can simultaneously punch all columns—say of an entire eighty column card—in one operation, a memory device could be inserted between the IBM input and the matrix output.

Where in a three-channel tape two variables, dependent upon a common independent variable of the tape "B" chcannel, are represented in channels "A" and "A–1," in addition to the previously described circuitry for the "A" and "B" channels, circuitry for the A–1 channel would be provided, identical with that for the tape "A" channel, the output of amplifier E–2 being fed also directly to the "B" channel of one counter and through a phasing circuit to the "B" channel of a second counter. In such cases the output of the second pair of counters required for the additional A–1 channel could be applied through a second matrix to the digit terminal strip and to three terminals of the column strip of the IBM machine programmed to take the output of one pair of counters and then of the other pair as successive card entries of the dependent variables, on a single card; or alternatively two IBM punches could be used, one for each dependent variable, with the date and period data of the single "B" channel applied to the two IBM punches in parallel.

When tape information is to be translated for feeding a computer machine or the like directly rather than through the medium of punched and printed cards, the switching circuitry between counters and machine, comprised of selector circuits J, matrix K, start relay, readout relay and non-repeat relay, may be modified as required to provide an input of specific form utilizable by the particular machine at appropriate times. In such case, customer or period or date or like identification data input may not be required; in which case the corresponding circuitry involving relays R–3, R–5, R–6 and R–7, plugboard N and the data repeat programming means Z would be omitted. However, a single merely sequential identification input correlated with the counted information from the tape may be required; and in this case the stepping relay switch network may be simplified to provide only one output of sequential numbers.

Although in the specific form of the invention disclosed in the drawings and the aforegoing description, the output derived from the matrix is in a decimal digital form since the decimal digital system is of such common application, where another numerical system is found useful for the digital output, the counter and matrix sections of the apparatus may be modified accordingly to produce a digital output of the required form.

We claim:

1. A system for translating information to a digital output form from tape having one longitudinal series or channel of longitudinally spaced impressions with the number of said impressions in a tape length interval being representative of a numerical value, and having a second adjacent longitudinal series or channel of impressions wherein each pair of successive impressions has a constant relation to a corresponding tape length interval of the first channel, said system comprising: means for producing signals from the first channel and signals from the second channel of a continually driven tape; first digital output counter means and second digital output counter means for counting signals from the first channel; means actuated by signals from the second channel and controlling respective counting cycles of said counter means for alternately counting signals produced from corresponding alternate successive lengths of the first channel; and switching means operated by a signal produced by each counter means at the end of a counting cycle to apply the corresponding counter output to a common input of apparatus utilizing the same.

2. A system for translating information as described in claim 1, said switching means including means adapted to convert the output of the said counter means from one digital code system for application in converted form to said common input of apparatus utilizing the same.

3. A system for translating information as described in claim 1, the first said means producing signals from the first channel in a selectable numerical proportion to first channel impressions and said switching means including means for multiplying the output of the counter means by powers of ten.

4. A system for translating information as described in claim 1, including means producing in digital output form identification data for the output of said counter means, the last said means including stepping relay means pulsed by the operation of said switching means for each counting cycle, and interconnected stepping relay advanced switch means forming a network changed to successive configurations representative of a series of distinct counter output identification data.

5. A system for translating information to a digital output form from a member having two adjacent extended parallel series or channel of impressions successively spaced along the channel, each impression in the first channel being representative of an increment of a numerical value, and each impression of the second channel having a constant relation to a corresponding length interval of the first channel, said system comprising: means including a pick-up for each channel for producing signals from the first channel and signals from the second channel of a member continually driven to carry said channels past the pick-ups; first digital output counter means and second digital output counter means for counting signals from the first channel; means actuated by signals from the second channel and controlling respective counting cycles of said counter means for alternately counting signals produced from corresponding alternate successive lengths of the first channel; and switching means operated by a signal produced by each counter means at the end of a counting cycle to apply the corresponding counter output to a common input of apparatus utilizing the same.

6. A system for translating information as described in claim 5, including means for resetting each said counter means after its output is applied to said input.

7. In a data processing system including a machine such as an electrical digital computer, electrical card punch, electrical card printer or the like utilizing digital input; translating apparatus to provide said input from a tape having information recorded therein as a longitudinally extended series or channel of impressions with each impression representing a unit increment of a varaible and a second separate longitudinally extended series or channels of impressions, the impressions of the second series having a known longitudinal positional relation to those of the first whereby information recorded in each tape length interval of the first channel corresponds to a distinct pair of successive second channel impressions, said apparatus comprising: means, including a transducer for each said channel and electric motor driven means to transport the tape continuously past the transducers for deriving pulses having a selected numerical relation to the tape first channel impressions and also pulses corresponding respectively to second tape channel impressions; first and second counter means each adapted to display at the end of a respective counting cycle a digital output representative of a number of pulses from the first channel counted thereby, each counter means including control circuit means for alternately starting and stopping its counting in response to successive pulses from the second channel applied thereto; phasing circuit means for withholding from the second counter only the first pulse derived from the second channel whereby the counters alternate in counting the first channel pulses for successive length intervals of the continuously driven tape; switching circuitry for connecting the output of each counter after the end of a counting cycle to said machine; and means for resetting each counter to zero after the output of each cycle is accepted by said machine.

8. In a data processing system, apparatus as set forth in claim 7, wherein the first said means also includes electronic multiplying and dividing means for selecting the numerical relation of the pulses derived from the first channel to the first channel impressions.

9. In a data processing system, apparatus as described in claim 7 wherein said counter means output is in a four-line code and said circuitry includes a relay matrix converting the four-line coded output of the counters to a ten-line coded output for connecting the output of each counter in converted form to said machine.

10. In a data processing system, apparatus as described in claim 7 wherein said counter means output is in a four-line code and said switching circuitry includes a relay matrix converting the four-line coded output to a ten-line coded output and also includes mechanical switch means effective selectively to multiply and divide the converted output, for connecting the output of each counter means in converted form to said machine.

11. In a data processing system, apparatus as described in claim 7 including means for sensing a simultaneous connection of an output of both counter means to said machine and effective to stop the transport of said tape.

12. In a data processing system, apparatus as set forth in claim 7 and adapted to translate tape having substantially equi-spaced impressions in the second channel, wherein the tape is transported at a substantially constant rate and said switching circuitry provides timed pulses one for each said cycle; and having means including a resistance-capacitance timing network charged by the last said pulses and responsive to omission of one pulse to stop transport of said tape.

13. In a data processing system, apparatus as set forth in claim 7 and adapted to translate tape having substantially equi-spaced impressions in the second channel, wherein the tape is transported at a substantially constant rate and said switching circuitry provides timed pulses one for each said cycle; said apparatus also including latching relay means having a current sensitive solenoid responsive to simultaneous connection of both counter means outputs to said machine for opening tape transport controlling contacts therein to stop tape transport; means for sensing omission of a timed pulse including a resistance-capacitance timing network maintained charged above a selected potential by regular occurrence of said time pulses, a vacuum tube with a grid circuit including said timing network and controlling a missing time pulse relay with contacts in series with the latching relay contacts to stop tape transport on omission of a timed pulse.

14. In a data processing system including translating apparatus as described in claim 13, visually indicating trouble analyzing means including a first lamp and a second lamp lit respectively to indicate a simultaneous application of the outputs of both counter means to said machine and to indicate a missing time pulse as a first occurring malfunction, a two-point lamp power switch in said latching relay closed on one point to light the first lamp upon tripping of the latching relay, and closed on the other when latched to control the power circuit of the second lamp, second relay switch means in the power circuit of said second lamp and closed upon deenergization of the missing pulse relay whereby the said two-point switch serves as a disabling means for the second lamp circuit upon lighting of the first.

15. A data processing system including: a machine utilizing digital input; translating apparatus to provide said input from a tape having information recorded therein as a longitudinally extended series or channel of impressions with each impression representing a unit increment of a variable and a second separate longitudinally extended series or channel of impressions, the impressions of the second series having a known longitudinal positional relation to those of the first whereby a pair of successive second channel impressions corresponds to a tape length interval of the first channel; and means for providing to said machine identification data for information translated from said tape; said apparatus comprising means including a transducer for each said channel and electric motor driven means to continuously transport the tape past the transducers for deriving pulses having a selected numerical relation to the tape first channel impressions and also pulses corresponding respectively to second tape channel impressions; first and second counter means each adapted to display at the end of a counting cycle a digital output representative of a number of pulses from the first channel counted thereby, each counter means including control circuit means for alternately starting and stopping its counting in response to successive pulses from the second channel applied thereto, phasing circuit means for withholding from the second counter means only the first pulse derived from the second channel whereby the counter means alternate in counting the first channel pulses for successive length intervals of the continuously driven tape, switching circuitry for connecting the output of each counter means after the end of a counting cycle to said machine, and means for resetting each counter to zero after the output of each cycle is accepted by said machine; said machine being programmed to accept identification data in preselected order relative to the sequence of count output; said switching circuitry providing an identification signal upon each application of a count to said machine; the means for providing said identification data including stepping relay means pulsed by the last said signal and interconnected stepping relay advanced switch means forming a network changed to successive configurations each providing a digital output for said machine representative of identification for the output of at least one count cycle.

16. A data processing system including: a machine utilizing digital input; translating apparatus to provide said input from a tape having information recorded therein as a longitudinally extended series or channel of impressions with each impression representing a unit increment of a variable and a second separate longitudinally extended series or channel of impressions, the impressions of the second series having a known longitudinal positional relation to those of the first whereby a pair of successive second channel impressions corresponds to a tape length interval of the first channel; and means for providing to said machine identification data for information translated from said tape; said apparatus comprising means including a transducer for each said channel and electric motor driven means to continuously transport the tape by the transducers for deriving pulses having a selected numerical relation to the tape first channel impressions and also pulses corresponding respectively to second tape channel impressions, first and second counter means each adapted to display at the end of a counting cycle a digital output representative of a number of pulses from the first channel counted thereby, each counter means including control circuit means for alternately starting and stopping its counting in response to successive pulses from the second channel applied thereto, phasing circuit means for withholding from the second counter only the first pulse derived from the second channel whereby the counter means alternate in counting the first channel pulses for successive length intervals of the continuously driven tape, switching circuitry for connecting the output of each counter means after the end of a counting cycle to said machine, and means for resetting each counter to zero after the output of each cycle is accepted by said machine; said machine being programmed to accept identification data in preselected order relative to the sequence of count output; said switching circuitry providing an identification signal upon each application of a count to said machine and also including non-repeat relay means energized to self-holding condition by said machine on acceptance of the count output for each cycle to prevent repeated acceptance by the machine of the count output of a given cycle and released upon resetting of the counter means providing the count output; the means for providing said identification data including stepping relay means pulsed by the last said signal and interconnected stepping relay advanced switch means forming a network changed periodically in the course of a sequence of count cycles to successive configurations, each configuration being representative of sequential identification for the output of at least one count cycle.

17. In a data processing system as set forth in claim 16, said motor driven means transporting the tape at substantially a constant rate, said switching circuitry also providing timed pulses one for each said cycle upon each application of a count to said machine, said relay means also providing a second timed pulse for each cycle; and system malfunction surveillance means including latching relay means having a current sensitive solenoid responsive to simultaneous connection of both counter means outputs to said machine for opening tape transport controlling contacts therein to stop tape transport, means for sensing omission of a first said timed pulse including a resistance-capacitance timing network maintained charged above a selected potential by regular occurrence of the first said timed pulse and a vacuum tube with a grid circuit including said timing network and controlling a missing pulse relay with contacts in series with the latching relay contacts to stop tape transport on omission of a first said timed pulse, and means similar to the last said means for sensing omission of a second said timed pulse and thereby sensing as a data interlock a failure of said machine to accept a cycle of counter means output in proper programmed sequence whereby tape transport is stopped.

18. In a data processing system including translating apparatus as described in claim 17, visually indicating trouble analyzing means including a first, second and third lamp lit respectively to indicate the first occurring malfunction causing stopping of tape transport, a two-point lamp power switch in said latching relay closed on one point to light the first lamp upon tripping of the latching relay, and closed on the other when latched to control power circuits of the second and third lamps whereby the said two-point switch serves as a disabling means for the second and third lamp circuits upon lighting of the first, second and third relay switch means in the power circuits of said second and third lamps and closed respectively upon deenergization of the missing pulse relay and the data interlock relay and in interlocking relation, whereby lighting of one of the second and third lamps disables the power circuit of the other.

19. In a data processing system having trouble analyzing means as set forth in claim 18, means operated by said stepping relay means for lighting a warning lamp as the numerical limit of the identification data means is approached and thereafter maintaining the warning light lit and for presenting a signal stopping operation of said machine.

20. An apparatus for counting impressions in each interval of a channel of longitudinally spaced impressions in a continuously transported tape, said tape having a second channel of longitudinal spaced impressions, comprising: means including a transducer scanning each channel for producing signals in selected ratio to the first channel impressions, and signals corresponding to the second channel impressions; a first counter and a second counter each having counter control circuits to start and stop a counting cycle by successively applied control signals, said counters being adapted to count signals from the first channel; and all signals from the second channel being applied to the first counter control circuit; a thyratron tube circuit including a relay closed upon thyratron firing to apply the second channel signals to the control circuit of the second counter, and a grid circuit applying the second channel signals to the thyratron control grid for firing on the first applied signal; whereby the counters alternate in counting successive channel intervals.

21. Apparatus for counting impressions in each interval of a channel of longitudinally spaced impressions in a continuously transported tape, said tape having a second channel of longitudinal spaced impressions, comprising: means including a transducer scanning each channel for producing signals in selected ratio to the first channel impressions, and signals corresponding to the second channel impressions; a first counter and a second counter each having counter control circuits to start and stop a counting cycle by successively applied control signals; said counters being adapted to count signals from the first channel and all signals from the second channel being applied to the first counter control circuit; means for withholding a first signal derived from the second channel from the control circuit of the second counter and applying all subsequent second channel signals thereto whereby the counters alternate in counting successive channel intervals; each said counter displaying simultaneously a four-line coded output for each decimal digit of the count, the code being presented by permutations of a given potential present or absent for each line; each counter also providing a control signal comprising a potential present during a count cycle and absent during output display; matrix means for translating a counter output to a ten-line decimal, coded output including for each counter output digit a set of vacuum tube cotnrolled relays with interconnected relay contacts forming a network of variable configuration, a distinct configuration being established for each of the decimal digits by corresponding four-line coded outputs applied to the grids of tubes therein; selector circuit means including a set of relays for each said counter to apply the respective output selectively to said matrix means, and a vacuum tube and vacuum tube operated control relay controlling energization of each said set, the control signal from each counter being applied to a corresponding last said vacuum tube, whereby the selector circuit is actuated to apply each counter output to said matrix upon completion of a count cycle.

22. Apparatus as described in claim 21 wherein each said control relay operates a relay adapted to indicate a readiness of the matrix for reading of its output.

23. Apparatus as described in claim 21 wherein each said control relay also applies a plate voltage to vacuum tubes in said matrix upon application of the output of a corresponding counter to said matrix.

24. Apparatus as described in claim 21 wherein each said control relay also provides a timed pulse upon application of a corresponding counter output to said matrix, said apparatus including a missing pulse sensing circuit responsive to omission of a timed pulse from proper timed sequence by producing a visual signal.

25. Apparatus as described in claim 21 having a current sensitive relay solenoid in a common supply line to solenoids of both said sets of relays, and a visual indicator operated by the current sensitive relay to indicate application of outptus of both counters to said matrix.

26. Apparatus for translating information recorded in tape form to punched card form, each card entry being proportioned to the number of impressions in each length interval of a channel of longitudinally spaced impressions in a continuously transported tape, said tape having a second channel of longitudinal spaced impressions, including counting apparatus and a summary card punching machine; said counting apparatus comprising means including a transducer scanning each channel for producing signals in selected ratio to the first channel impressions, and signals corresponding to the second channel impressions; a first counter and a second counter each having counter control circuits to start and stop a counting cycle by successively applied control signals; said counters being adapted to count signals from the first channel and all signals from the second channel being applied to the first counter control circuit; means for withholding a first signal derived from the second channel from the control circuit of the second counter and applying all subsequent second channel signals thereto whereby the counters alternate in counting successive channel intervals; each said counter displaying simultaneously a four-line coded output for each decimal digit of the count, the code being presented by permutations of a given potential present or absent for each line; each counter also providing a control signal comprising a potential present during a count cycle and absent during output display; matrix means for translating a counter output to a ten-line decimal coded output supplied to the input of said machine including for each counter output digit a set of vacuum tube controlled relays with interconnected relay contacts forming a network of variable configuration, a distinct configuration being established for each of the decimal digits by corresponding four-line coded outputs applied to the grids of tubes therein; selector circuit means including a set of relays for each said counter to apply the respective output selectively to said matrix means, and a vacuum tube and vacuum tube operated control relay controlling energization of each said set, the control signal from each counter being applied to a corresponding last said vacuum tube, whereby the selector circuit is actuated to apply each counter output to said matrix upon completion of a count cycle; a read-out relay with contacts in series with a matrix output line for the highest order digit of said matrix, preventing punching of a matrix output when open; starting relay means subject to a machine interlock, energized by a relay in respective said sets, having contacts in series with the read-out relay solenoid for permitting closure of said read-out relay; and a non-repeat relay having contact means serving when energized for self-holding and when deenergized as a series connection with the read-out relay solenoid, said non-repeat relay being pulsed to a self-holding condition by said machine after the matrix output is read out and released upon deenergization of the selector circuit relay set.

27. Apparatus as described in claim 26 including means for producing a ten-line coded output identifying counter output information, sequentially or by periods comprising a sub-pulse stepping relay including a plurality of rotary switches advanced stepwise thereby, said sub-pulse relay being actuated by pulses produced by each operational cycle of the start relay; rotary switch means advanced by a second stepping relay; a plugboard and receptacle therefor, said receptacle having connections to said switches and to the second stepping relay whereby selective plugboard connections may be established to pass a selected number of the last said start relay pulses, to the second stepping relay; said receptacle having connections to said switches and other connections to the input of said machine, whereby a selected network may be established through said rotary switch means to provide a decimal digit output by each of successive configurations resulting from stepwise advance of said switch means; said machine being programmed to accept periodically the last said output for punching.

28. Apparatus as described in claim 27, wherein said rotary switch means includes a switch closed to pass a corresponding single pulse of the last said starting relay pulses in each of a predetermined number of periods; and having second means for producing an output identifying counter output information as pertaining to units consisting of said predetermined number of periods; the last said means comprising a stepping relay advanced ten-point units switch pulsed by each said single pulse, said units switch including contact means adapted to pass every tenth pulse actuating the same, and a stepping relay advanced tens switch actuated by the pulse passed by the unit switch and having a number of points extending through a plurality of decades; the points of the units and tens switches identifiable by numbers of like terminal digits being commonly connected to provide a ten-line coded decimal output.

29. Apparatus as described in claim 26, including means for automatically providing an identification number on each punched card indicative of a-day-of-year to which pertains the tape recorded information translated to the card from a tape having second channel impressions recorded thereon for an integral number of equal time intervals per day; said means comprising a stepping relay and a plurality of rotary switches advanced stepwise by each pulsing of the stepping relay, each cycle of starting relay operation providing a pulse to the stepping relay; a second stepping relay and rotary switch means actuated thereby having N switch points at which each stepping action terminates and corresponding to N equal divisions of a day and adapted to pass one last said pulse at one point; each of said plurality of rotary switches being adapted to pass a respective part of the pulses applied thereto to the second stepping relay; and plugboard means for selective application of the starting relay pulses to a said rotary switch passing one pulse for each 1/Nth of the tape time interval occuring per day of recorded data; a third stepping relay actuated by pulses passed through the rotary switch means, said third relay advancing a ten-point units rotary switch and an associated switch closed once per revolution of the units switch to pass one said pulse; and a fourth stepping relay actuated by pulses passed by the associated switch operating ganged tens and hundreds rotary switches; the ten points of the units switch being connected as a ten-line coded output to said machine for unit digits zero to nine, the ten switch having thirty-seven points designated as zero to thirty-six whereof points of like unit digits are commonly connected with like numbered points of the units switch; and the hundreds switch having a first set of ten points zero to nine, a second set of ten, a third set of ten, and a fourth set of six connected respectively to the points zero, one, two and three of the units switch, whereby the machine may scan successively terminals of the hundreds, tens, and units switch arms to read a three digit ten-line coded decimal digit output for punch identification of first channel information currently punched, and means for initially synchronizing the positions of the said rotary switches to correspond with a known time of the beginning of the tape record.

30. Apparatus as described in claim 29 and adapted to provide automatically advanced card sequence identification wherein said rotary switch means has twenty-four points and is ganged with a like second and like third switch as tens and units switches respectively for period-of-day identification; and has a plugboard and receptacle, the receptacle having ten connections for applying a ten-line coded output to said machine, connections to each of the twenty-four points of the said second switch, and three other connections to the said third switch respectively to the first ten points in common, to the second ten points and the last four points; whereby the machine may scan successively the terminals for the arms of the last said tens and units switches for punched sequence identification of successive cards carrying information of a single day; said plugboard being wired to form a selected network to provide a desired sequence of decimal numbers in ten-line coded output, whereby the card sequence information available for punching may be changed by exchange of plugboards.

31. Apparatus as described in claim 26, including means for automatically providing an identification number on each punched card indicative of a-day-of-year to which pertains the tape recorded information translated to the card from a tape having second channel impressions recorded thereon for an integral number of equal time intervals per day, each cycle of starting relay operation providing a pulse to said means; said means comprising a stepping relay and rotary switch means actuated thereby having N switch points at which each stepping action terminates and corresponding to N equal divisions of a day and adapted to pass one last said pulse at one point; means adapted to pass to the stepping relay a preselected part of the pulses representing one pulse for each 1/Nth of the tape time interval occurring per day of recorded data; a second stepping relay actuated by pulses passed through the rotary switch means, said second relay advancing a ten-point units rotary switch and an associated switch closed once per revolution of the units switch to pass one said pulse; and a third stepping relay actuated by pulses passed by the associated switch and operating ganged tens and hundreds rotary switches; the ten points of the units switch being connected as a ten-line coded output to said machine for unit digits zero to nine, the ten switch having thirty-seven points designated as zero to thirty-six whereof points of like unit digits are commonly connected with like numbered points of the units switch; and the hundreds switch having a first set of ten points zero to nine, a second set of ten, a third set of ten, and a fourth set of six connected respectively to the points zero, one, two and three of the units switch, whereby the machine may scan successively terminals of the hundreds, tens, and units switch arms to read a three digit ten-line coded decimal digit output for punch identification of first channel information currently punched, and means for initially synchronizing the positions of the said rotary switches to correspond with a known time of the beginning of the tape record.

32. Apparatus as set forth in claim 31 wherein the said tens and hundreds switches each have at least one unused point after point thirty-six in each, and have ganged therewith a further rotary switch with two points disposed to be contacted by a corresponding switch arm when the tens and hundreds switches are at points thirty-six and the first unused point therein, said further switch serving to activate a visual indicator as the numerical output limit of the day-of-year identification means is approached.

33. For use in conjunction with apparatus translating into punched card form from a continuously running tape data recorded in a first channel of longitudinally spaced impressions, said tape having a second channel of impressions indicative of time intervals for which corresponding length intervals of the first channel are recorded, said apparatus including a card punching machine receiving a ten-line coded decimal input; means for providing on each card a time identification automatically advanced with progression of translation, said time identification being in terms of a unit consisting of an integral number of said time intervals, said means comprising a stepping relay and a ten point rotary units switch advanced thereby stepwise upon actuation of the said relay, said apparatus producing for each interval of translated data a pulse adapted to actuate said relay when applied thereto; means receiving said pulses and adapted to pass and apply to said relay but one pulse of each successive number of pulses corresponding to the number of intervals in said unit; a rotary tens switch and like rotary hundreds switch ganged therewith and a stepping relay therefor, said units switch having associated therewith switch means adapted to close on one step of each units switch rotation to pulse the last said stepping relay; said tens switch having a zero point and a plurality of decades of points with each like unit numbered point of each decade and the zero point commonly connected to like numbered points of said units switch, said hundreds switch having a plurality of decades of connected points, with a zero point beginning the first decade, the decades being connected with respective unit switch points beginning with unit point one; said unit switch points providing a ten-line coded decimal output to said machine, whereby the machine may scan successively terminals for rotary switch arms of the hundreds, tens and units switches to read out a three digit time identification.

References Cited in the file of this patent

UNITED STATES PATENTS

| | | |
|---|---|---|
| 2,609,143 | Stibitz | Sept. 2, 1952 |
| 2,656,524 | Gridley et al. | Oct. 20, 1953 |
| 2,807,005 | Weidenhammer | Sept. 17, 1957 |
| 2,860,323 | Burkhart et al. | Nov. 11, 1958 |
| 2,877,450 | Hamilton et al. | Mar. 10, 1959 |
| 2,895,783 | Cohen | July 21, 1959 |

UNITED STATES PATENT OFFICE

CERTIFICATION OF CORRECTION

Patent No. 2,960,266 November 15, 1960

Clement T. Loshing et al.

It is hereby certified that error appears in the above numbered patent requiring correction and that the said Letters Patent should read as corrected below.

Column 4, line 11, for "availabilty" read -- availability --; column 5, line 22, for "circuit E" read -- circuit F --; column 12, line 5, for "disignated" read -- designated --; column 15, line 14, before "once" insert -- only --; column 16, line 3, after "36-37" insert -- used --; line 16, for "advancsing" read -- advancing --; column 17, lines 59 and 60, for "adpustable" read -- adjustable --; column 18, line 63, after "cause" insert -- the --; column 23, line 17, for "slightly" read -- slight --; column 27, line 38, for "chcannel" read -- channel --; column 32, line 58, for "cotnrolled" read -- controlled --; column 33, line 13, for "outptus" read -- outputs --.

Signed and sealed this 6th day of June 1961.

(SEAL)
Attest:

ERNEST W. SWIDER
Attesting Officer

DAVID L. LADD
Commissioner of Patents